(12) United States Patent
Kim

(10) Patent No.: US 12,007,814 B2
(45) Date of Patent: Jun. 11, 2024

(54) FLEXIBLE DISPLAY ASSEMBLY AND ELECTRONIC DEVICE INCLUDING THE SAME

(71) Applicant: Samsung Electronics Co., Ltd., Suwon-si (KR)

(72) Inventor: Seonghoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 967 days.

(21) Appl. No.: 16/971,173

(22) PCT Filed: Aug. 6, 2020

(86) PCT No.: PCT/KR2020/010418
§ 371 (c)(1),
(2) Date: Aug. 19, 2020

(87) PCT Pub. No.: WO2021/025494
PCT Pub. Date: Feb. 11, 2021

(65) Prior Publication Data
US 2023/0095925 A1    Mar. 30, 2023

(30) Foreign Application Priority Data
Aug. 6, 2019  (KR) .................. 10-2019-0095545

(51) Int. Cl.
*G06F 1/16*      (2006.01)
*G09G 3/00*      (2006.01)

(52) U.S. Cl.
CPC .......... *G06F 1/1681* (2013.01); *G09G 3/035* (2020.08)

(58) Field of Classification Search
None
See application file for complete search history.

(56) References Cited

U.S. PATENT DOCUMENTS

| 9,087,998 B2 | 7/2015 | Jang et al. | |
|---|---|---|---|
| 9,478,759 B2 | 10/2016 | Jang et al. | |
| 10,055,067 B2 | 8/2018 | Shinkai et al. | |
| 10,083,636 B2 * | 9/2018 | Han | H10K 50/844 |
| 10,368,452 B2 * | 7/2019 | Yun | H10K 77/111 |

(Continued)

FOREIGN PATENT DOCUMENTS

| CN | 104656998 A | 5/2015 |
|---|---|---|
| KR | 10-2015-0000778 A | 1/2015 |

(Continued)

OTHER PUBLICATIONS

International Search Report dated Nov. 27, 2020, issued in International Application No. PCT/KR2020/010418.

*Primary Examiner* — Long Pham
(74) *Attorney, Agent, or Firm* — Jefferson IP Law, LLP

(57) ABSTRACT

A flexible display assembly and an electronic device are provided. The electronic device includes the flexible display assembly. The flexible display assembly includes a display panel layer, an un-even structure layer, at least a part of which includes protrusions and recesses, a buffer layer arranged between the display panel layer and the un-even structure layer and including at least one projection, at least a part of which is inserted into a valley of the protrusions and recesses, and a support layer arranged on one surface of the buffer layer and formed to support at least a part of the buffer layer.

21 Claims, 20 Drawing Sheets

(56) References Cited

U.S. PATENT DOCUMENTS

| | | |
|---|---|---|
| 2016/0026297 A1 | 1/2016 | Shinkai et al. |
| 2016/0093024 A1 | 3/2016 | Kang et al. |
| 2018/0374399 A1* | 12/2018 | Han .................... H10K 50/844 |
| 2023/0095925 A1* | 3/2023 | Kim ......................... G09F 9/30 |
| | | 361/679.01 |

FOREIGN PATENT DOCUMENTS

| | | |
|---|---|---|
| KR | 10-2018-0021299 A | 3/2018 |
| KR | 10-2018-0079016 A | 7/2018 |
| KR | 10-2019-0003257 A | 1/2019 |

\* cited by examiner

FLEXIBLE DISPLAY ASSEMBLY AND ELECTRONIC DEVICE INCLUDING THE SAME

CROSS-REFERENCE TO RELATED APPLICATION(S)

This application is a U.S. National Stage application under 35 U.S.C. § 371 of an International application number PCT/KR2020/010418, filed on Aug. 6, 2020, which is based on and claims priority of a Korean patent application number 10-2019-0095545, filed on Aug. 6, 2019, in the Korean Intellectual Property Office, the disclosure of which is incorporated by reference herein in its entirety.

TECHNICAL FIELD

The disclosure relates to a flexible display assembly and an electronic device including the same.

BACKGROUND

Electronic devices support various types of interfaces to improve an interaction with a user. A display, among various interfaces, is recognized as a core interface which explicitly provides an input and output of information resources accompanying various functions or services. Therefore, advanced displays are proposed based on improved hardware or software, and, for example, may include flexible displays having at least one foldable region.

The above information is presented as background information only to assist with an understanding of the disclosure. No determination has been made, and no assertion is made, as to whether any of the above might be applicable as prior art with regard to the disclosure.

DISCLOSURE

Technical Problem

An electronic device including a flexible display may further include a functional structure for implementing a set structure of the electronic device or supporting operation of a function of the electronic device. For example, an electronic device may include a digitizer, which is arranged on a rear surface of a flexible display or between some layers to detect a digital pen-based input to the flexible display. Alternatively, the electronic device may include a plate, which is arranged on the rear surface of the flexible display and is folded together with the flexible display so as to suppress deterioration of the rigidity of the flexible display due to frequent folding.

The above functional structures may include, in relation to implementation of desired functions of the structures, protrusions and recesses of an electrode pattern or grating structure (e.g., a grating structure formed by a plurality of openings, a grating structure formed by a plurality of lattices, or a grating structure formed by a plurality of slits), wherein the protrusions and recesses may be caused by deformation of at least some layers of the flexible display. For example, some layers of the flexible display which contact the protrusions and recesses of the functional structures may be pressed by the protrusions and recesses so that at least a partial region of the layers may be deformed, and this deformation may transfer to a display panel arranged on the layers, thus causing deformation of the display panel. When the display panel is deformed due to the protrusions and recesses arranged below, the surface of the display panel may not be formed normally, and thus a pattern similar to the protrusions and recesses may be viewed from the outside of the electronic device, and, due to the viewed pattern, the quality or resolution of a flexible display may be deteriorated.

Aspects of the disclosure are to address at least the above-mentioned problems and/or disadvantages and to provide at least the advantages described below. Accordingly, an aspect of the disclosure is to provide a flexible display assembly having a structure for preventing quality deterioration due to protrusions and recesses arranged on the rear surface of a flexible display or between some layers thereof and an electronic device including the flexible display assembly.

Additional aspects will be set forth in part in the description which follows and, in part, will be apparent from the description, or may be learned by practice of the presented embodiments.

Technical Solution

In accordance with an aspect of the disclosure, a flexible display assembly is provided. The flexible display assembly includes a display panel layer, an un-even structure layer, at least a part of which includes protrusions and recesses, a buffer layer arranged between the display panel layer and the un-even structure layer and including at least one projection, at least a part of which is inserted into a valley of the protrusions and recesses, and a support layer arranged on one surface of the buffer layer and formed to support at least a part of the buffer layer.

In accordance with another aspect of the disclosure, an electronic device is provided. The electronic device includes at least one hinge structure, a first housing structure arranged on one side of the at least one hinge structure and connected to one region of the at least one hinge structure, a second housing structure arranged on another side of the at least one hinge structure, connected to another region of the at least one hinge structure, and performing folding and unfolding motions with respect to the first housing structure based on a hinge motion of the at least one hinge structure, and the flexible display assembly arranged so as to be supported by at least a part of the first housing structure and at least a part of the second housing structure.

In accordance with another aspect of the disclosure, an electronic device is provided. The electronic device includes a support member, a side surface member connected to at least a part of an edge of the support member, and a display assembly arranged in a space formed by connecting the support member and the side surface member, wherein the display assembly includes a window layer having a partial region that is adjacent to the side surface member and is bent in a first manner towards the side surface member with a specified curvature, a display panel layer arranged on one surface of the window layer and bent in a second manner with a curvature corresponding to the specified curvature, a wiring layer formed in a terminal end of a region, which is bent in the second manner, of the display panel layer and including at least one protrusion and recess, and a buffer layer arranged on one surface of the display panel layer so that at least a part of the buffer layer is adjacent to the wiring layer, wherein the at least a part adjacent to the wiring layer is inserted into the valley of the at least one protrusion and recess.

Advantageous Effects

According to various embodiments of the present disclosure, layers having characteristics capable of absorbing or relieving protrusions and recesses that affect a flexible display are adopted as some layers of the flexible display, and thus the quality or resolution of the flexible display may be improved.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device of one aspect, to which a flexible display assembly according to various embodiments of the disclosure may be applied, will be described with reference to FIGS. 1A, 1B, 1C, 1D, 2, and 3.

Figure 1A:
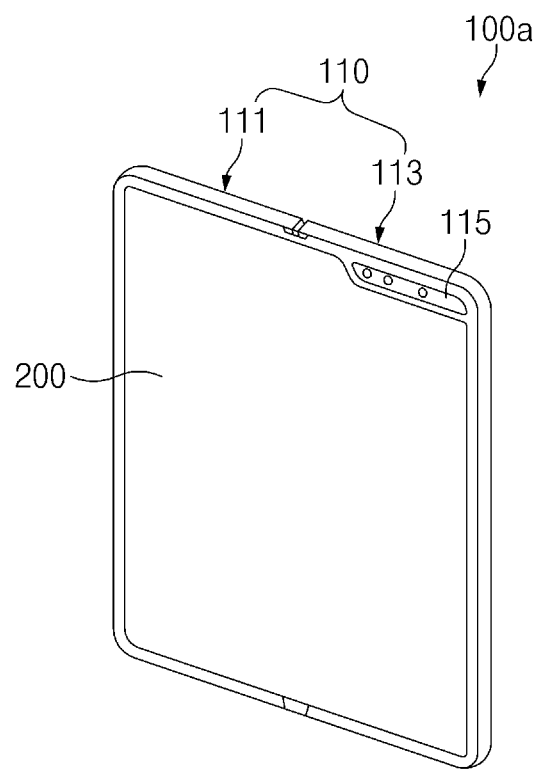
FIG. 1A is a diagram illustrating a front surface of an electronic device of a first state according to an embodiment of the disclosure.

FIG. 1A is a diagram illustrating a front surface of an electronic device of a first state according to an embodiment of the disclosure.

Figure 1B:
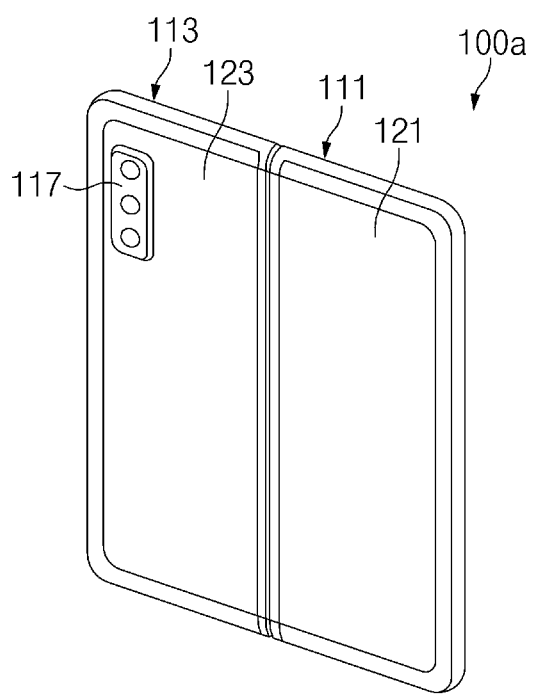
FIG. 1B is a diagram illustrating a rear surface of an electronic device of a first state according to an embodiment of the disclosure.

FIG. 1B is a diagram illustrating a rear surface of an electronic device of the first state according to an embodiment of the disclosure.

Figure 1C:
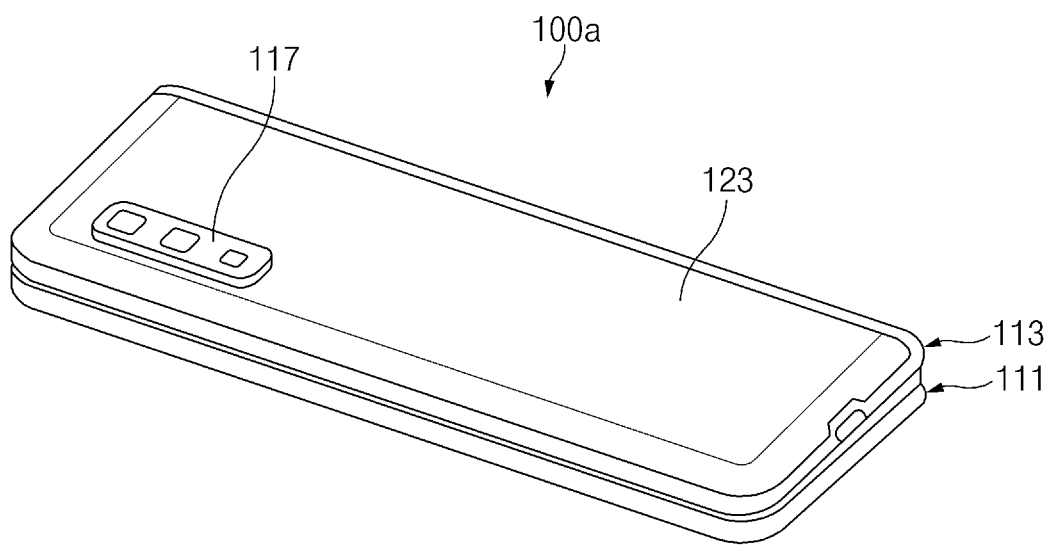
FIG. 1C is a diagram illustrating an electronic device of a second state viewed in one direction according to an embodiment of the disclosure.

FIG. 1C is a diagram illustrating an electronic device of a second state viewed in one direction according to an embodiment of the disclosure.

Figure 1D:
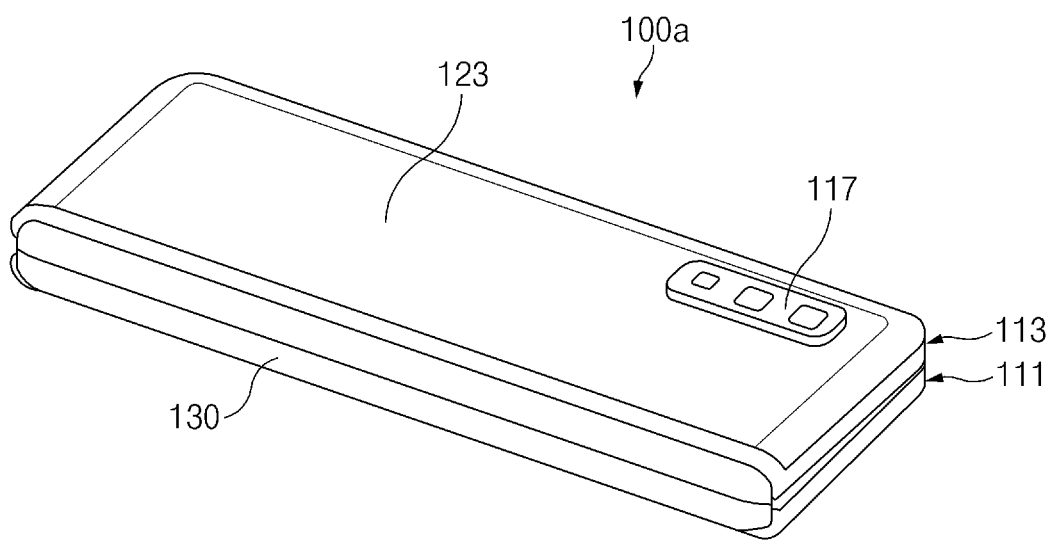
FIG. 1D is a diagram illustrating an electronic device of a second state viewed in a opposite direction to one direction according to an embodiment of the disclosure.

FIG. 1D is a diagram illustrating an electronic device of a second state viewed in an opposite direction to one direction according to an embodiment of the disclosure.

Figure 2:
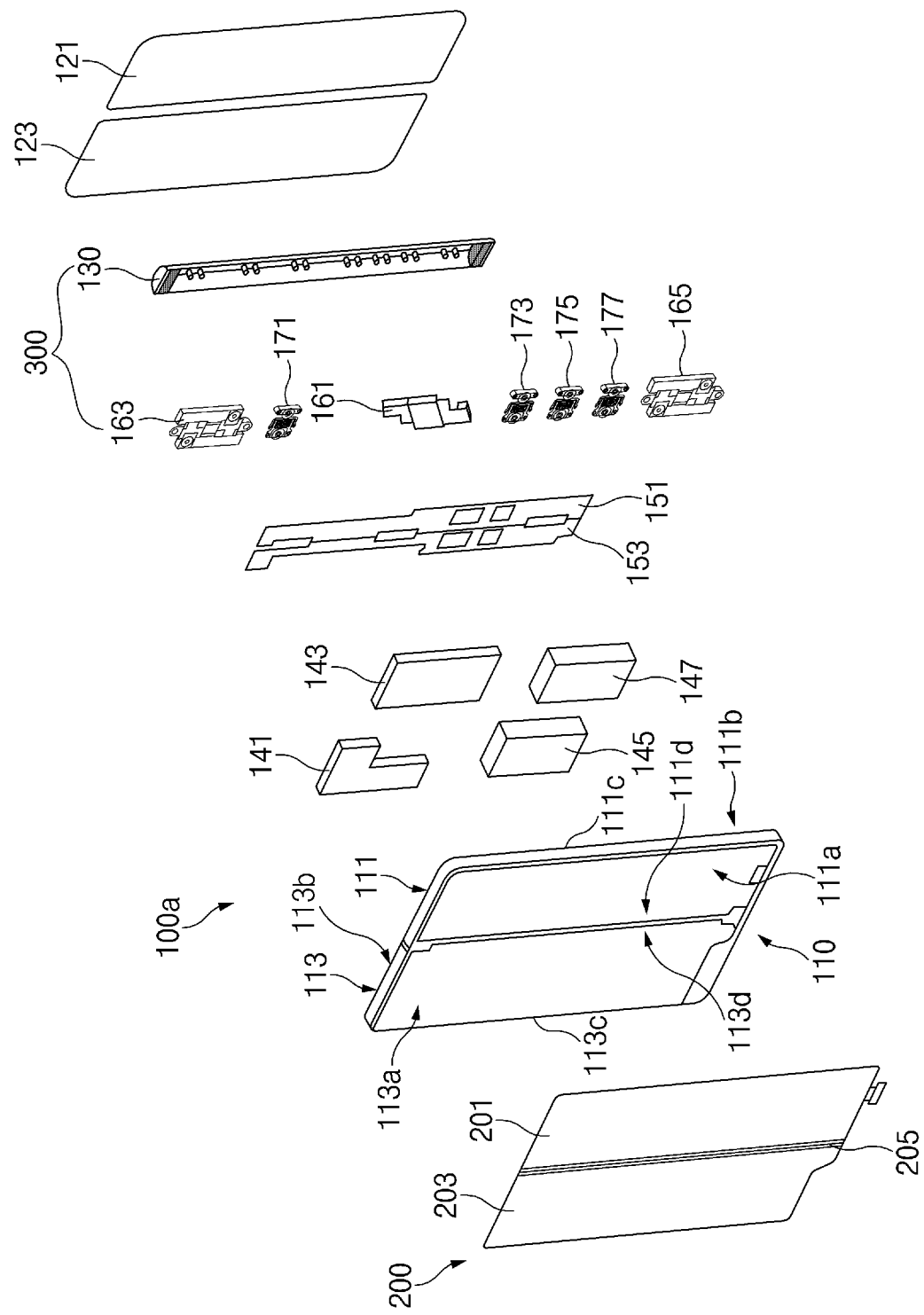
FIG. 2 is a diagram illustrating a configuration of an electronic device according to an embodiment of the disclosure.

FIG. 2 is a diagram illustrating a configuration of an electronic device according to an embodiment of the disclosure.

Figure 3:
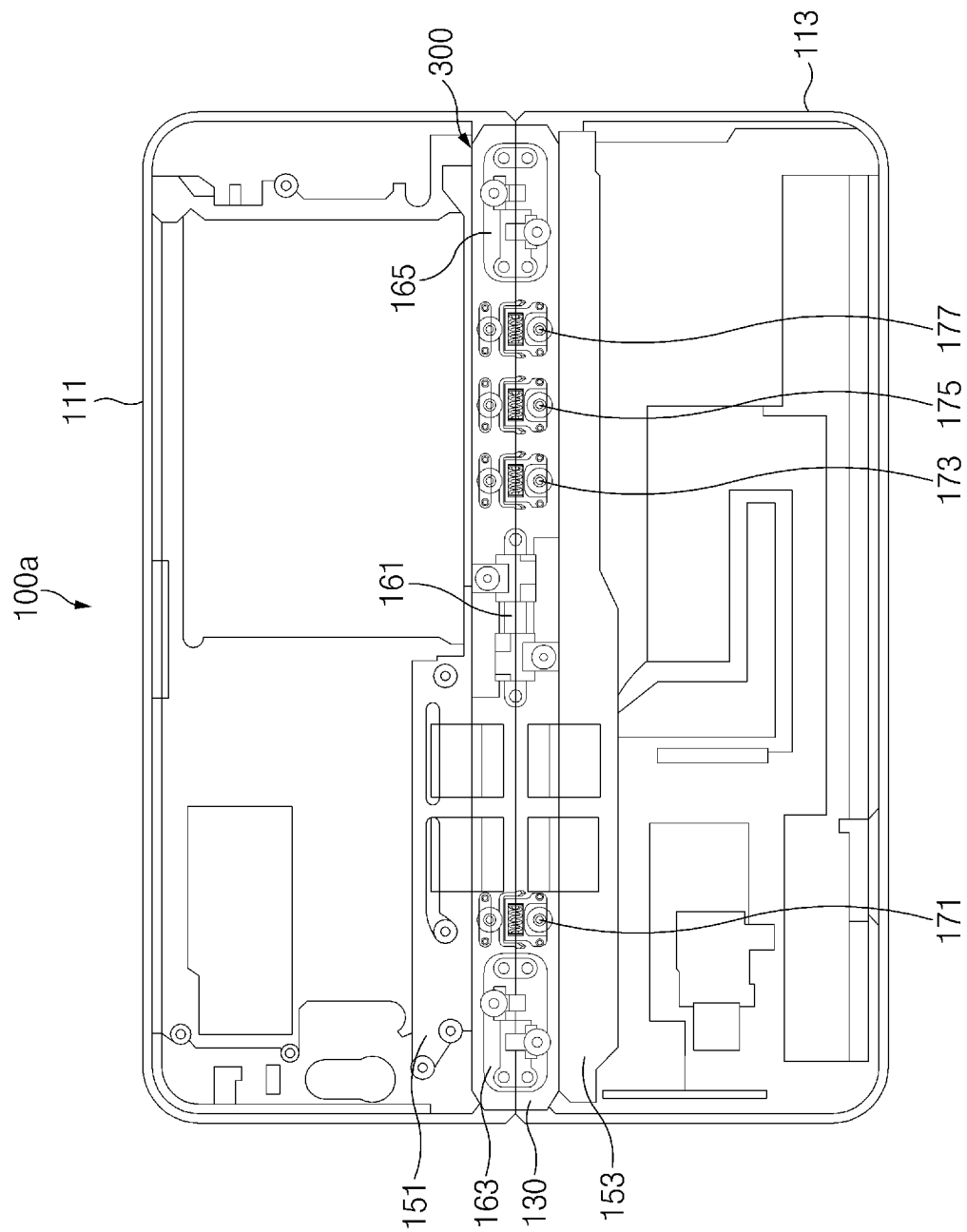
FIG. 3 is a diagram illustrating that some components of an electronic device according to an embodiment of the disclosure.

FIG. 3 is a diagram illustrating that some components of an electronic device according to an embodiment of the disclosure.

Referring to FIGS. 1A, 1B, 1C, 1D, 2, and 3, an electronic device 100*a* (FIG. 1A, 1B, 1C, 1D, 2, or 3) according to an embodiment (e.g., first embodiment) of the disclosure may include a housing 110 (FIG. 1A or 2), a pair of covers 121 and 123 (FIG. 2 or 3), a pair of hinge plates 151 or 153 (FIG. 2 or 3), a flexible display assembly 200 (FIG. 1A or 2) (hereinafter referred to as a display assembly), and a hinge module 300 (FIG. 2 or 3). In various embodiments of the disclosure, at least one of the foregoing elements may be omitted or another element may be added to the electronic device 100a. For example, the electronic device 100a may further include at least one sensor and various electronic components arranged on the housing 110 or in an internal space formed by combining the housing 110 and the pair of covers 121 and 123.

In an embodiment of the disclosure, the housing 110 may include a first housing structure 111 (FIG. 1A, 1B, 1C, 1D, 2, or 3) and a second housing structure 113 (FIG. 1A, 1B, 1C, 1D, 2, or 3) which are pivotable with respect to each other based on the hinge structure described below (e.g., the pair of hinge plates 151 and 153, a first hinge structure 161 (FIG. 2 or 3), a second hinge structure 163 (FIG. 2 or 3), and a third hinge structure 165 (FIG. 2 or 3)). For example, the first housing structure 111 and the second housing structure 113 may be symmetrical or asymmetrical to each other and may be arranged on two sides of the hinge structure. One region of each of the first housing structure 111 and the second housing structure 113 may be coupled to at least a part of the hinge structure so that the first housing structure 111 and the second housing structure 113 may be folded or unfolded to or from each other with the hinge structure as an axis. According to an embodiment of the disclosure, when the first housing structure 111 and the second housing structure 113 are folded to each other, at least a part of the first housing structure 111 and at least a part of the second housing structure 113 may face each other or may substantially contact each other. Furthermore, when the first housing structure 111 and the second housing structure 113 are unfolded from each other, the first housing structure 111 and the second housing structure 113 may be parallel to each other or may form an angle within a pivot range supported by the hinge structure. In the various embodiments mentioned below, a first state of the electronic device 100a may represent a state in which the first housing structure 111 and the second housing structure 113 are unfolded (or spread) from each other. In addition, in the various embodiments mentioned below, a second state of the electronic device 100a may represent a state in which the first housing structure 111 and the second housing structure 113 are folded (or bent) to each other.

In an embodiment of the disclosure, the first housing structure 111 may include a first surface 111a (FIG. 2) (e.g., a front surface), a second surface 111b (FIG. 2) (e.g., a rear surface) opposite to the first surface 111a, and a first side surface 111c (FIG. 2) surrounding at least a portion of an edge of each of the first surface 111a and the second surface 111b. The first side surface 111c, for example, may be excluded from an edge region 111d (FIG. 2) in which the first housing structure 111 is coupled to at least a part of the hinge structure, and may extend to a predetermined length so as to form a height difference with the first surface 111a and the second surface 111b. Likewise, the second housing structure 113 may include a third surface 113a (FIG. 2) (e.g., a front surface), a fourth surface 113b (FIG. 2) opposite to the third surface 113a, and a second side surface 113c (FIG. 2) surrounding at least a portion of an edge of each of the third surface 113a and the fourth surface 113b. The second side surface 113c, for example, may be excluded from an edge region 113d (FIG. 2) in which the second housing structure 113 is coupled to at least a part of the hinge structure. The second side surface 133c may extend to the same length as the first side surface 111c so as to form a height difference with the third surface 113a and the fourth surface 113b. Accordingly, when the housing 110 is configured by coupling the first housing structure 111 and the second housing structure 113 to at least a part of the hinge structure, the housing 110 may include a first recess formed by the first surface 111a, the third surface 113a, the first side surface 111c, and the second side surface 113c and a second recess formed by the second surface 111b, the fourth surface 113b, the first side surface 111c, and the second surface 113c.

In an embodiment of the disclosure, the second housing structure 113 may have at least one senor arranged therein, which detects a variety of information about an operation environment of the electronic device 100a. For example, at least one of a proximity sensor, an illumination sensor, a biometric (e.g., iris, heart rate, and/or fingerprint) sensor, or an image sensor may be arranged in the second recess of the second housing structure 113. In relation to this configuration, a first sensor region 115 (FIG. 1A) for exposing the at least one sensor to the outside (e.g., the front of the electronic device 100a) may be formed in the second housing structure 113 occupying one region of a front surface of the electronic device 100a. According to an embodiment of the disclosure, in order to expose the at least one sensor to the outside, the second housing structure 113 may include at least one first opening that penetrates the first surface 113a and the second surface 113b. In addition, in order to expose the at least one sensor to the outside, the first sensor region 115 may include at least one second opening at a position corresponding to the at least one first opening.

In an embodiment of the disclosure, the pair of covers 121 and 123 may include a first cover 121 arranged facing the second surface 111b of the first housing structure 111 and a second cover 123 arranged facing the fourth surface 113b of the second housing structure 113. The first cover 121 and the second cover 123 may be formed in shapes that are symmetrical or match each other. An edge of each of the first cover 121 and the second cover 123 may be covered with the first side surface 111c of the first housing structure 111 and the second side surface 113c of the second housing structure 113. The first cover 121 and the second cover 123 may form a most part of the rear surface of the electronic device 100a. According to an embodiment of the disclosure, a second sensor region 117 (FIG. 1B, 1C, or 1D) may be formed on the second cover 123 to expose the at least one sensor arranged in the second housing structure 113 (or the second recess) to the outside (e.g., the rear of the electronic device 100a). The second sensor region 117 may include at least one third opening related to external exposure of the at least one sensor. In various embodiments of the disclosure, the first cover 121 and the second cover 123 may be included as a part of the housing 110. For example, the first cover 121 may be integrated with the first housing structure 111. The second cover 123 may be integrated with the second housing structure 113.

In an embodiment of the disclosure, various electronic components related to operation of the electronic device 100a may be arranged in the second recess closed by the first cover 121 and the second cover 123. For example, in the second recess, a first printed circuit board 143 (FIG. 2) and a first battery 147 (FIG. 2) may be arranged between the second surface 111b of the first housing structure 111. The first cover 121, and a second printed circuit board 141 (FIG. 2) and a second battery 145 (FIG. 2) may be arranged between the second surface 113b of the second housing structure 113 and the second cover 123. According to various embodiments of the disclosure, the first printed circuit board 143 and the second printed circuit board 141 may be integrated as a single printed circuit board. The first printed circuit board 143 and the second printed circuit board 141 may be arranged between the first cover 121 and the second surface 111b of the first housing structure 111 or between the second cover 123 and the second surface 113b of the second housing structure 113. Likewise, the first battery 147 and the second battery 145 may be integrated as a single battery. The first battery 147 and the second battery 145 may be arranged between the first cover 121 and the second surface 111b of the first housing structure 111 or between the second cover 123 and the second surface 113b of the second housing structure 113. In an embodiment of the disclosure, at least one among at least one processor, a communication circuit, an antenna, a microphone, a speaker, a camera, and at least one sensor may be mounted on the first printed circuit board 143 and the second printed circuit board 141.

In an embodiment of the disclosure, the flexible display assembly 200, at least a part of which is flexible, may be arranged in the first recess of the housing 110 formed by the first surface 111a and the first side surface 111c of the first housing structure 111 and the third surface 113a and the second side surface 113c of the second housing structure 113. For example, at least a part of the flexible display assembly 200 may be accommodated in the first recess so as to face or contact the first surface 111a of the first housing structure 111 and the third surface 113a of the second housing structure 113. At least a part of an edge of the flexible display assembly 200 may be covered with the first side surface 111c of the first housing structure 111 and the second side surface 113c of the second housing structure 113, thus forming a most part of the front surface of the electronic device 100a. In relation to this configuration, the first housing structure 111 and the second housing structure 113 may be formed of a metal or nonmetal material having rigidity enough to support at least a part of the flexible display assembly 200.

In an embodiment of the disclosure, the flexible display assembly 200 may include a first region 205 (FIG. 2) (e.g., a longitudinal center axis region of the flexible display assembly 200), which is foldable and unfoldable and overlaps at least a part of a hinge structure (e.g., the pair of hinge plates 151 and 153, the first hinge structure 161, the second hinge structure 163, and the third hinge structure 165) arranged between the first housing structure 111 and the second housing structure 113, and a second region 201 (FIG. 2) on one side and a third region 203 (FIG. 2) on another side with respect to the first region 205. According to an embodiment of the disclosure, the second region 201 of the flexible display assembly 200 may be arranged on the first surface 111a of the first housing structure 111, and the second region 201 may be arranged on the third surface 113a of the second housing structure 113. For example, the second region 201 and the third region 203 of the flexible display assembly 200 may adhere to the first surface 111a of the first housing structure 111 and the third surface 113a of the second housing structure 113 respectively based on a specified adhesive member. In an embodiment of the disclosure, the first region 205 of the flexible display assembly 200 may be prevented from adhering by the adhesive member, and, thus, the first region 205 may not be constrained by the first housing structure 111 and the second housing structure 113. In this case, in the second state (e.g., a folded state or bent state) of the electronic device 100a, a predetermined gap may be formed between the first region 205 of the flexible display assembly 200 and the hinge structure arranged between the first housing structure 111 and the second housing structure 113.

In an embodiment of the disclosure, the hinge module 300 may include a hinge housing 130 (FIG. 1D, 2, or 3), and the first hinge structure 161, the second hinge structure 163, the third hinge structure 165, and at least one detent structure 171, 173, 175, and/or 177 (FIG. 2 or 3) accommodated in the hinge housing 130.

In an embodiment of the disclosure, the hinge housing 130 may be arranged between the first housing structure 111 and the second housing structure 113. The hinge housing 130 may be exposed to the outside or shielded by at least a part of the first housing structure 111 and the second housing structure 113 according to the first state (e.g., an unfolded state or spread state) or the second state (e.g., a folded state or bent state) of the electronic device 100a. For example, as illustrated in FIGS. 1A and 1B, when the electronic device 100a is in the first state, the hinge housing 130 may be hidden by the first housing structure 111 and the second housing structure 113 and thus may not be exposed to the outside. Alternatively, as illustrated in FIGS. 1C and 1D, when the electronic device 100a is in the second state, at least a part of the hinge housing 130 may be exposed to the outside between the first housing structure 111 and the second housing structure 113.

In an embodiment of the disclosure, the hinge housing 130 may have a shape of a half cylinder (or half-elliptical cylinder) achieved by cutting a hollow cylinder (or elliptical cylinder) in a longitudinal direction of the first housing structure 111 or the second housing structure 113. An outer surface of the hinge housing 130 may include a curved surface. At least a part of a cutting plane of the hinge housing 130 may include an open internal space. In an embodiment of the disclosure, the first hinge structure 161, the second hinge structure 163, the third hinge structure 165, and the at least one detent structure 171, 173, 175, and/or 177 may be placed and fixed in the internal space of the hinge housing 130. For example, the first hinge structure 161 may be arranged in a center region of the internal space of the hinge housing 130. The second hinge structure 163 and the third hinge structure 165 may be respectively arranged in two terminal regions of the internal space of the hinge housing 130. The at least one detent structure 171, 173, 175, and/or 177 may be arranged in at least a part of a region between the first hinge structure 161 and the second hinge structure 163 and a region between the first hinge structure 161 and the third hinge structure 165.

In an embodiment of the disclosure, while fixed in the internal space of the hinge housing 130, the first hinge structure 161, the second hinge structure 163, the third hinge structure 165, and the at least one detent structure 171, 173, 175, and/or 177 may support, in association with the pair of hinge plates 151 and 153, the first housing structure 111 and the second housing structure 113 so that the first housing structure 111 and the second housing structure 113 may be pivotable with respect to each other. In relation to this configuration, one region of each of the first hinge structure 161, the second hinge structure 163, the third hinge structure 165, and the at least one detent structure 171, 173, 175, and/or 177 adjacent to the first housing structure 111 may be coupled to an edge region on one side of the first hinge plate 151. An edge region on another side of the first hinge plate 151 may be coupled to the edge region 111d (e.g., an edge region of the second surface 111b of the first housing structure 111) of the first housing structure 111 adjacent to the second housing structure 113. Likewise, another region of each of the first hinge structure 161, the second hinge structure 163, the third hinge structure 165, and the at least one detent structure 171, 173, 175, and/or 177 adjacent to the second housing structure 113 may be coupled to an edge region on one side of the second hinge plate 153. An edge region on another side of the second hinge plate 153 may be coupled to the edge region 113d (e.g., an edge region of the fourth surface 113b of the second housing structure 113) of the second housing structure 113 adjacent to the first housing structure 111.

According to the above descriptions, the one region of each of the first hinge structure 161, the second hinge structure 163, the third hinge structure 165, and the at least one detent structure 171, 173, 175, and/or 177 may be connected to the edge region on one side of the first housing structure 111 via the first hinge plate 151. The other region of each of the first hinge structure 161, the second hinge structure 163, the third hinge structure 165, and the at least one detent structure 171, 173, 175, and/or 177 may be connected to the edge region on one side of the second housing structure 113 via the second plate 153. In this case, when a pressure (e.g., a pressure by a body of a user) for changing a state is applied to the electronic device 100a, the first hinge plate 151 and the second hinge plate 153 may pivot with respect to each other. The first hinge structure 161, the second hinge plate 163, and the third hinge structure 165 coupled to the first hinge plate 151 and the second hinge plate 153 perform a hinge motion so that the first housing structure 111 and the second housing structure 113 may be folded to or unfolded from each other.

According to various embodiments of the disclosure, the at least one detent structure 171, 173, 175, and/or 177 is a mechanical device. The at least one detent structure 171, 173, 175, and/or 177 may suppress a folding or unfolding motion of the first housing structure 111 and the second housing structure 113 with respect to each other. For example, during the folding or unfolding motion of the first housing structure 111 and the second housing structure 113 with respect to the each other, the at least one detent structure 171, 173, 175, and/or 177 may temporarily suppress the folding or unfolding motion when a pressure applied to the electronic device 100a is equal to or less than a specified intensity. The at least one detent structure 171, 173, 175, and/or 177 may support to continue the folding or unfolding motion when the pressure applied to the electronic device 100a exceeds the specified intensity during the folding or unfolding motion of the first housing structure 111 and the second housing structure 113 with respect to the each other.

Figure 4A:
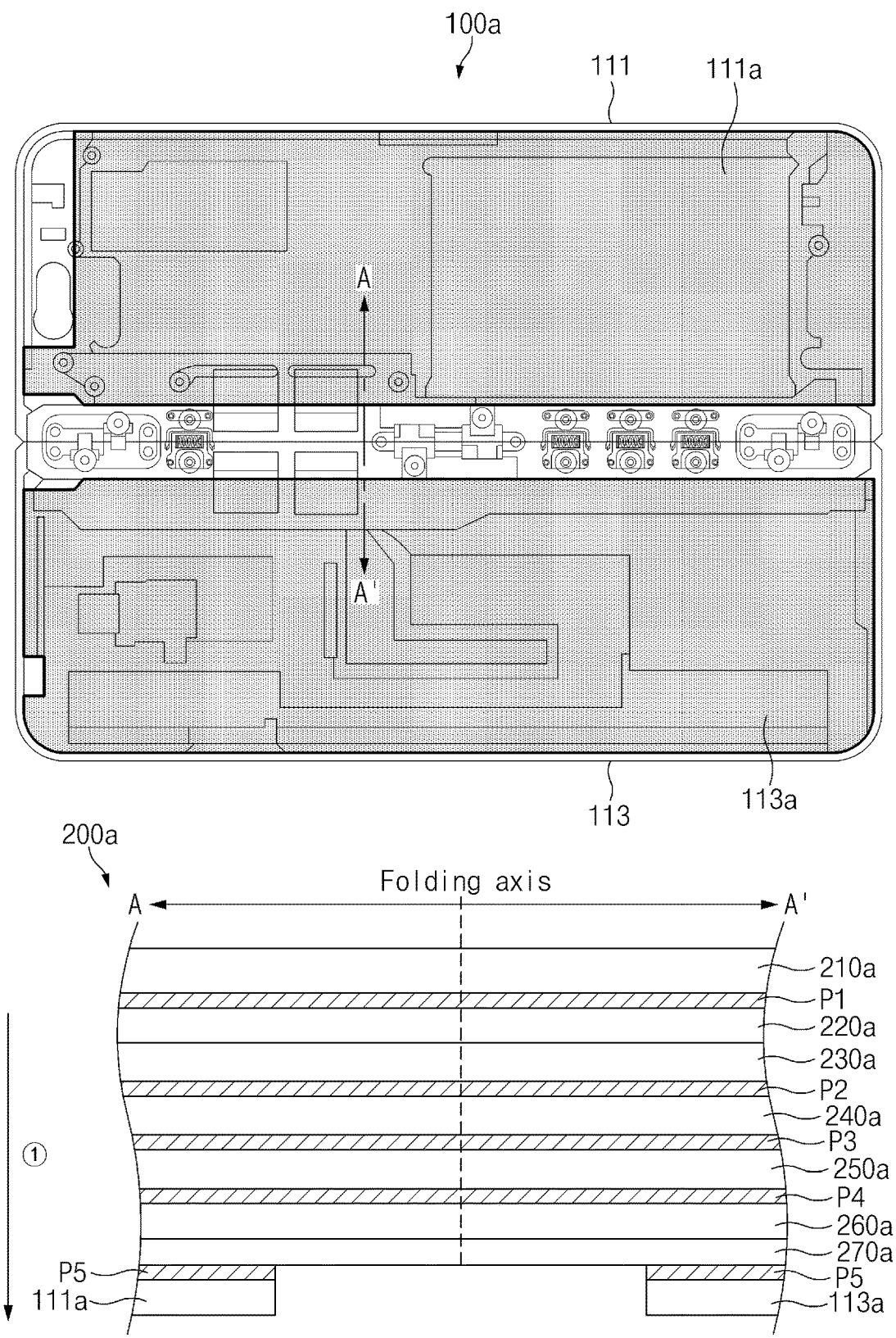
FIG. 4A is a diagram illustrating a cross-section of a first display assembly, taken along one direction, according to an embodiment of the disclosure.

FIG. 4A is a diagram illustrating a cross-section of a first display assembly, taken along one direction, according to an embodiment of the disclosure.

Figure 4B:
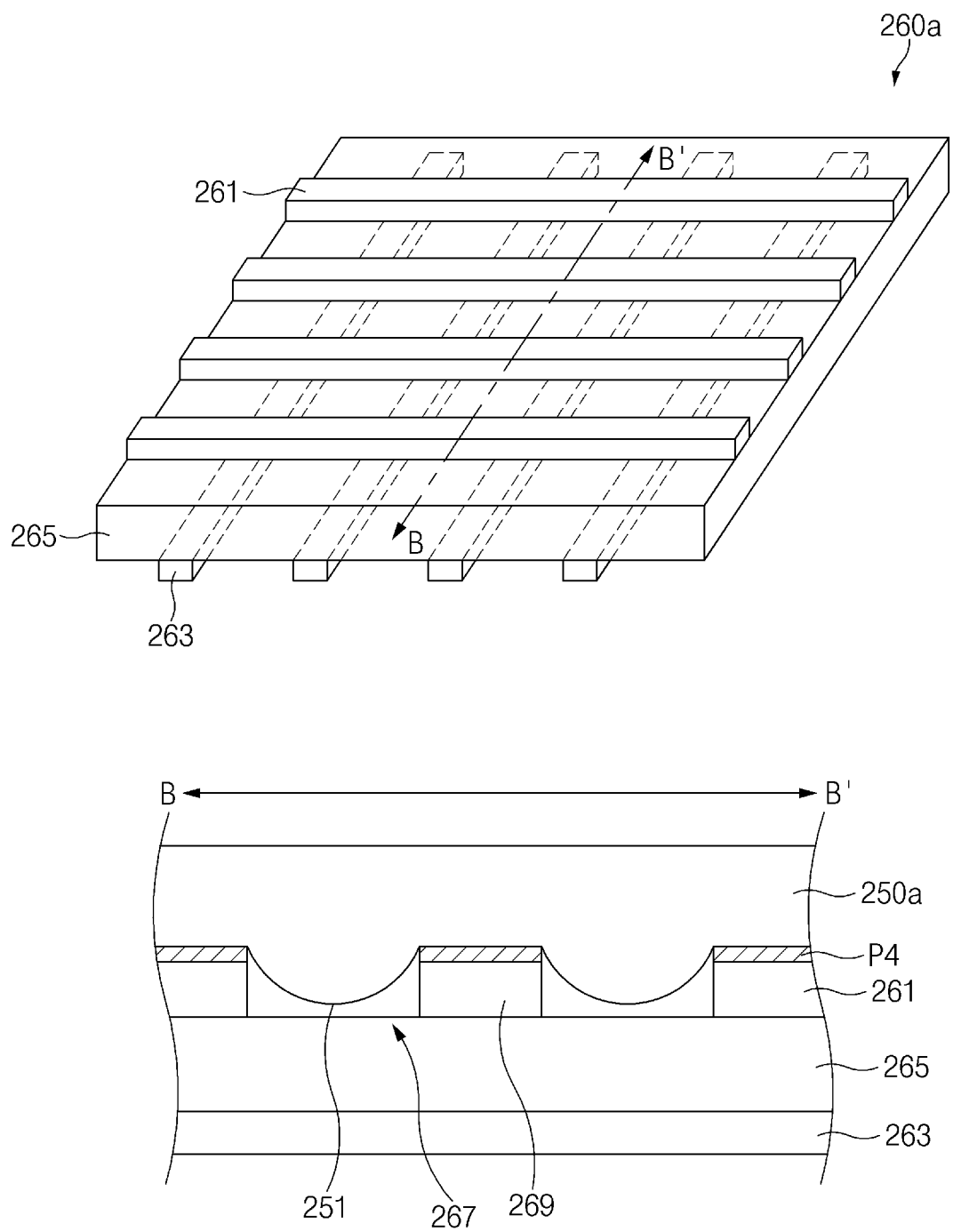
FIG. 4B is a diagram illustrating an arrangement form of a buffer layer and a digitizer according to an embodiment of the disclosure.

FIG. 4B is a diagram illustrating an arrangement form of a buffer layer and a digitizer according to an embodiment of the disclosure.

Referring to FIG. 4A, the cross-section of the first display assembly taken along one direction may be regarded as a cross-section taken along the line A-A'. Furthermore, the first display assembly may be similar to the display assembly (e.g., the flexible display assembly 200 of FIG. 2) mentioned above with reference to the above-mentioned figures, or may further include other embodiments.

Referring to FIGS. 4A and 4B, a first display assembly 200a (FIG. 4A) of the electronic device 100a (FIG. 4A) according to an embodiment (e.g., the first embodiment) of the disclosure, for example, may be arranged so that at least a part of the first display assembly 200a faces or contacts the first surface 111a (FIG. 4A) of the first housing structure 111 (FIG. 4A) and the third surface 113a (FIG. 4A) of the second housing structure 113 (FIG. 4A) on the first surface 111a and the third surface 113a (or in the first recess formed by the first housing structure 111 and the second housing structure 113). For example, the first display assembly 200a may adhere to the first surface 111a and the third surface 113a based on a specified adhesive member P5 (FIG. 4A) (e.g., optical clear adhesive (OCA), pressure sensitive adhesive (PSA), thermal reactive adhesive, optical reactive adhesive, or double-sided tape).

In an embodiment of the disclosure, the first display assembly 200a may include a plurality of layers stacked in a specified order. For example, the first display assembly 200a may include a window layer 210a (FIG. 4A) (e.g., a polymer layer or ultra-thin glass (UTG) layer), at least a part of which is exposed to the outside (e.g., the front of the electronic device 100a), and an un-even structure layer 260a (FIG. 4A or 4B) arranged under the window layer 210a in a first direction (direction ①). The first display assembly 200a may further include a display panel layer 230a (FIG. 4A), a support layer 240a (FIG. 4A), and a buffer layer 250a (FIG. 4A or 4B) arranged in the first direction (direction ①) between the window layer 210a and the un-even structure layer 260a.

In various embodiments of the disclosure, the first display assembly 200a may further include at least one polarization layer 220a (FIG. 4A) arranged in at least a part between the window layer 210a and the display panel layer 230a and between the display panel layer 230a and the support layer 240a. The at least one polarization layer 220a, for example, may be formed so as to fix or regularly change an electric field direction of light, and may selectively transmit only light that vibrates with a designated phase axis among light incident to the window layer 210a, or may delay a phase of incident light.

In various embodiments of the disclosure, the first display assembly 200a may further include a metal layer 270a (FIG. 4A) (e.g., a metal layer including magnetic metal powder) arranged one surface of the un-even structure layer 260a (e.g., a rear surface of the un-even structure layer 260a in the first direction (direction ①). The metal layer 270a, for example, may have dark color (e.g., black) to provide a basic background during an off operation of the display panel layer 230a. For example, during the off operation of the display panel layer 230a, the user may experience an effect as if the user views a dark (e.g., black) screen due to the metal layer 270a.

In various embodiments of the disclosure, the window layer 210a and the at least one polarization layer 220a, the display panel layer 230a and the support layer 240a, the support layer 240a and the buffer layer 250a, and the buffer layer 250a and the un-even structure layer 260a may be coupled to each other by adhering to one surface or another surface of specified adhesive members P1, P2, P3, and P4 (e.g., optical clear adhesive (OCA), pressure sensitive adhesive (PSA), thermal reactive adhesive, optical reactive adhesive, or double-sided tape). Layers other than those above-mentioned layers may be coupled through the above adhesives. According to various embodiments of the disclosure, some layers of the first display assembly 200a may be produced or injected as a single integrated layer without being coupled by the adhesive members during a manufacturing process.

In an embodiment of the disclosure, the un-even structure layer 260a may include a digitizer capable of detecting, based on an electromagnetic induction scheme, an input by a digital pen, which is adjacent to or in contact with the window layer 210a.

According to various embodiments of the disclosure, a capacitive scheme may be applied as a technique for recognizing a digital pen. According to the capacitive scheme, a current is allowed to flow to a display, and an electrical change due to contact or proximity of a conductor (e.g., a digital pen) is detected to detect the conductor. The digital pen, for example, may be classified into an electromagnetic resonance (EMR)-type digital pen using an electromagnetic resonance scheme and an active electrostatic solution (AES)-type digital pen using an active electrostatic solution scheme. In the case of the EMR-type digital pen, an additional panel, i.e., a digitizer, is arranged in a display, and an electronic device may recognize a location of the digital pen using a radio frequency and a coil, in which a current flows, in the digital pen. For example, when the digitizer generates and transfers a magnetic field to the digital pen, the digital pen may detect the magnetic field, and energy transferred to the digital pen is transferred as a radio frequency signal via a circuit in the digital pen so that a signal strength may be measured. In the case of the AES-type digital pen, the digital pen itself may include an electromagnetic generator to operate without an additional digitizer.

In an embodiment of the disclosure, the digitizer may include a first electrode pattern 261 (FIG. 4B), a second electrode pattern 263 (FIG. 4B), and a dielectric layer 265 (FIG. 4B) arranged between the first electrode pattern 261 and the second electrode pattern 263 to generate a magnetic field. In an embodiment of the disclosure, the first electrode pattern 261 may include an electrode array in which a plurality of electrodes extend in one direction and are spaced a specified separation distance apart. The second electrode pattern 263 may include an electrode array in which a plurality of electrodes extend in a direction perpendicular to the one direction and are spaced a specified separation distance apart. Based on this configuration, the plurality of electrodes included in the first electrode pattern 261 may form protrusions and recesses due to a height difference with the dielectric layer 265 according to the separation distance between the plurality of electrodes.

In an embodiment of the disclosure, the buffer layer 250*a* arranged on (e.g., in the opposite direction to the first direction (direction ①)) the un-even structure layer 260*a* may absorb or relieve at least a portion of the protrusions and recesses formed in the un-even structure layer 260*a*. In relation to this configuration, with regard to a laminate cross-section of the buffer layer 250*a* and the un-even structure layer 260*a* taken along the line B-B' illustrated in FIG. 4B, a rear surface of the buffer layer 250*a* (e.g., one surface facing or contacting the un-even structure layer 260*a*) may include at least one projection 251 (FIG. 4B), at least a part of which is inserted into a valley 267 (FIG. 4B) (or the separation distance between the plurality of electrodes included in the first electrode pattern 261) of the protrusions and recesses included in the un-even structure layer 260*a*. According to an embodiment of the disclosure, since at least a part of the at least one projection 251 is inserted into the valley 267 of the protrusions and recesses, a phenomenon in which a ridge 269 (FIG. 4B) of the protrusions and recesses presses the buffer layer 250*a* and causes deformation of the buffer layer 250*a* may be suppressed. Thus, a phenomenon in which deformation of the buffer layer 250 transfers to upper layers and a pattern similar to the protrusions and recesses is viewed from the outside is suppressed. In an embodiment of the disclosure, with regard to flexible insertion of the at least one projection 251 into the valley 267 of the protrusions and recesses, at least a part of the buffer layer 250*a* may include a material having a specified density characteristic. For example, at least a part of the buffer layer 250*a* may include a thermoplastic polyurethane elastomer (TPU) material having a density of about 0.85 g/cm3 or less, an acryl material having a density of about 0.7 g/cm3 or less, or a mixture material of the thermoplastic polyurethane material and the acryl material.

In an embodiment of the disclosure, the support layer 240*a* arranged on (e.g., in the opposite direction to the first direction (direction ①)) the buffer layer 250*a* may support the buffer layer 250*a*. For example, the support layer 240*a* may reinforce rigidity for at least a part of the buffer layer 250*a* (e.g., one surface facing or contacting the support layer 240*a*) so that the at least a part of the buffer layer 250*a* is not bent or deformed by an external pressure (e.g., an external impact applied to the electronic device 100*a* or press by the ridge 260 of the protrusions and recesses). In relation to this configuration, at least a part of the support layer 240*a* may include a material having a relatively greater rigidity or higher density compared to the buffer layer 250*a*. For example, the support layer 240*a* may include a UTG material, but is not limited thereto. Thus, in various embodiments of the disclosure, the support layer 240*a* may include various materials having an elastic modulus characteristic within a range of from about 50 GPa to about $10^3$ GPa.

Figure 5A:
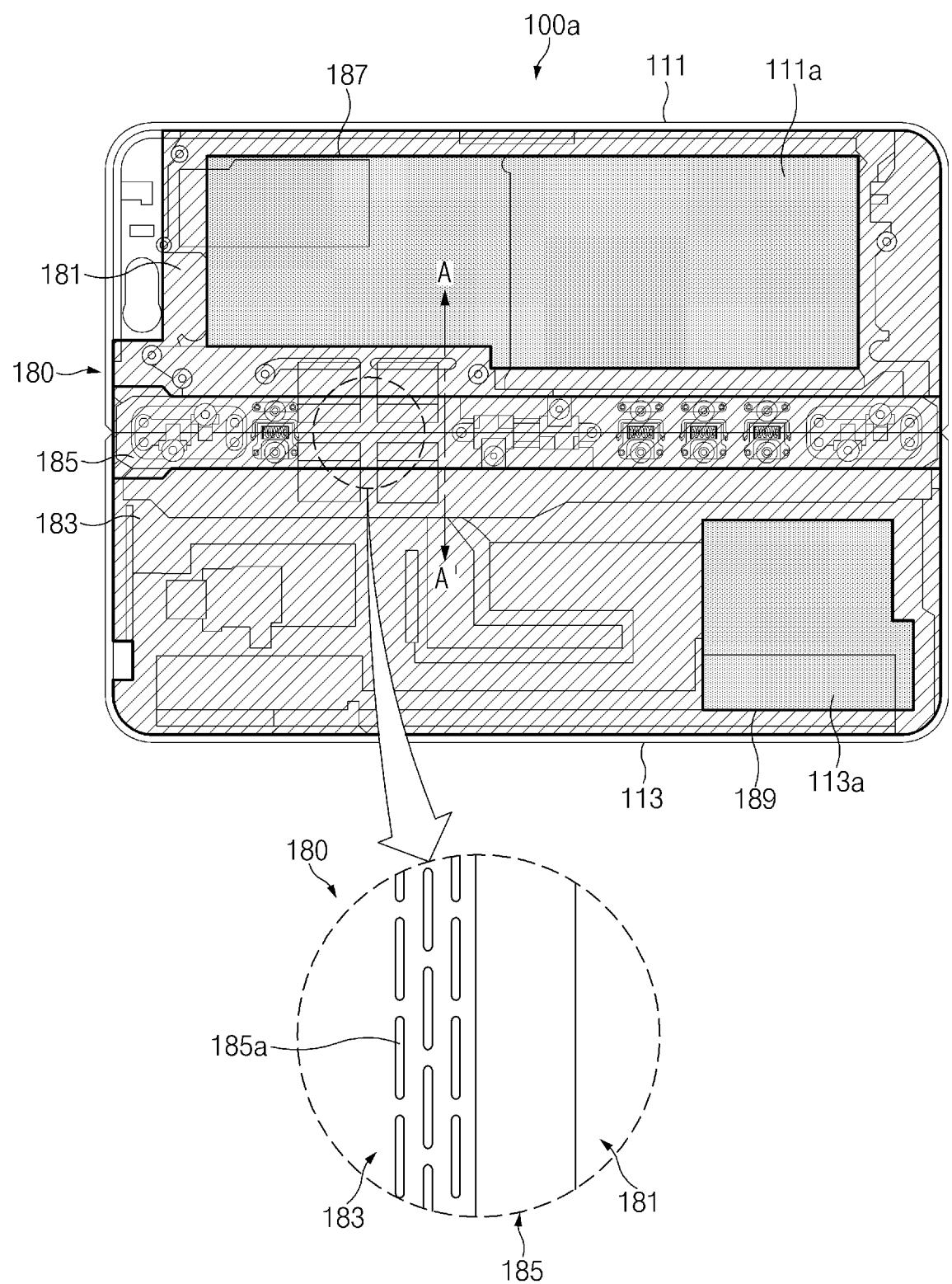
FIG. 5A is a diagram illustrating a metal plate arranged on a housing according to an embodiment of the disclosure.

FIG. 5A is a diagram illustrating a metal plate arranged on a housing according to an embodiment of the disclosure.

Figure 5B:
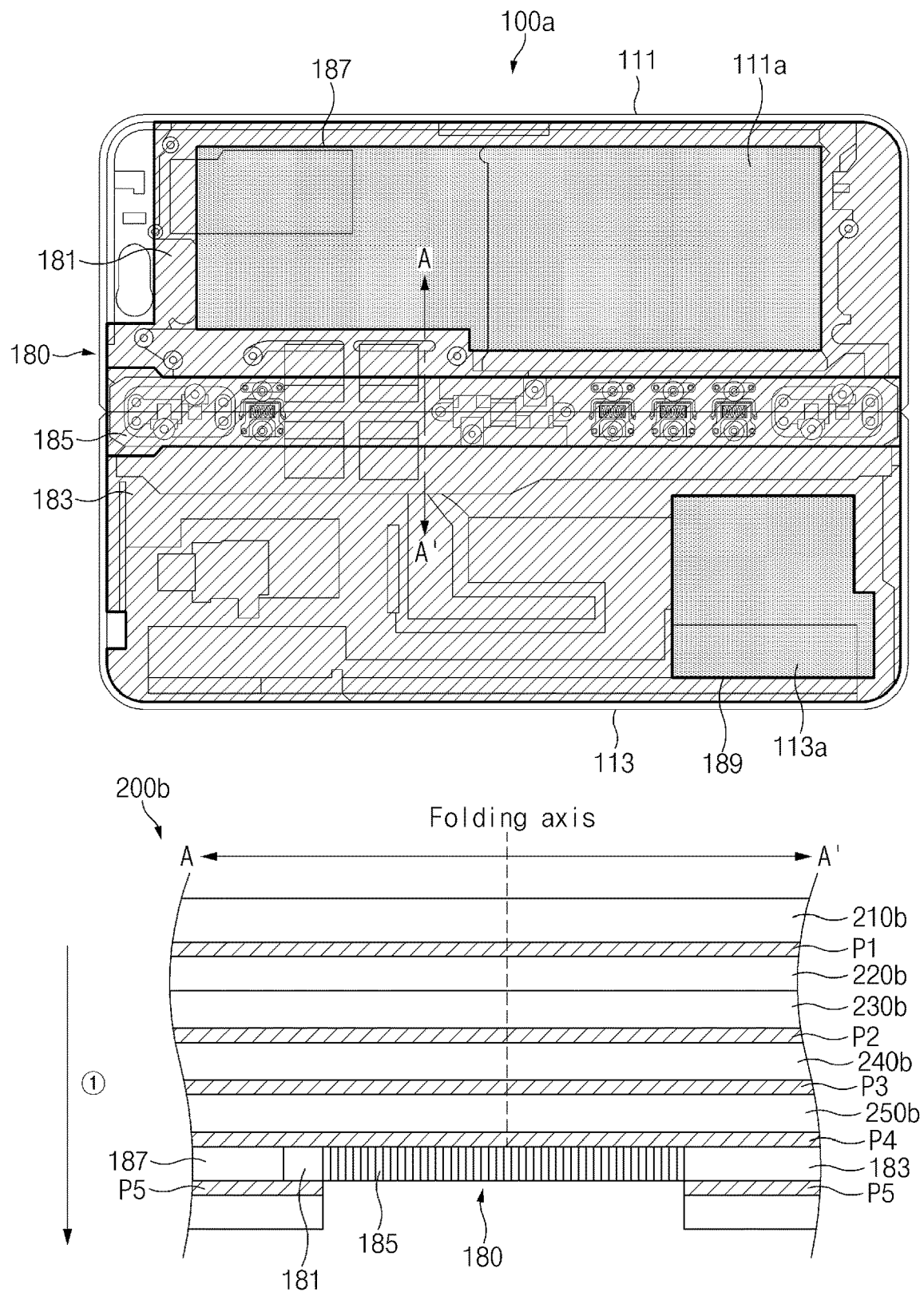
FIG. 5B is a diagram illustrating a cross-section of a second display assembly taken along one direction according to an embodiment of the disclosure.

FIG. 5B is a diagram illustrating a cross-section of a second display assembly taken along one direction according to an embodiment of the disclosure.

Figure 5C:
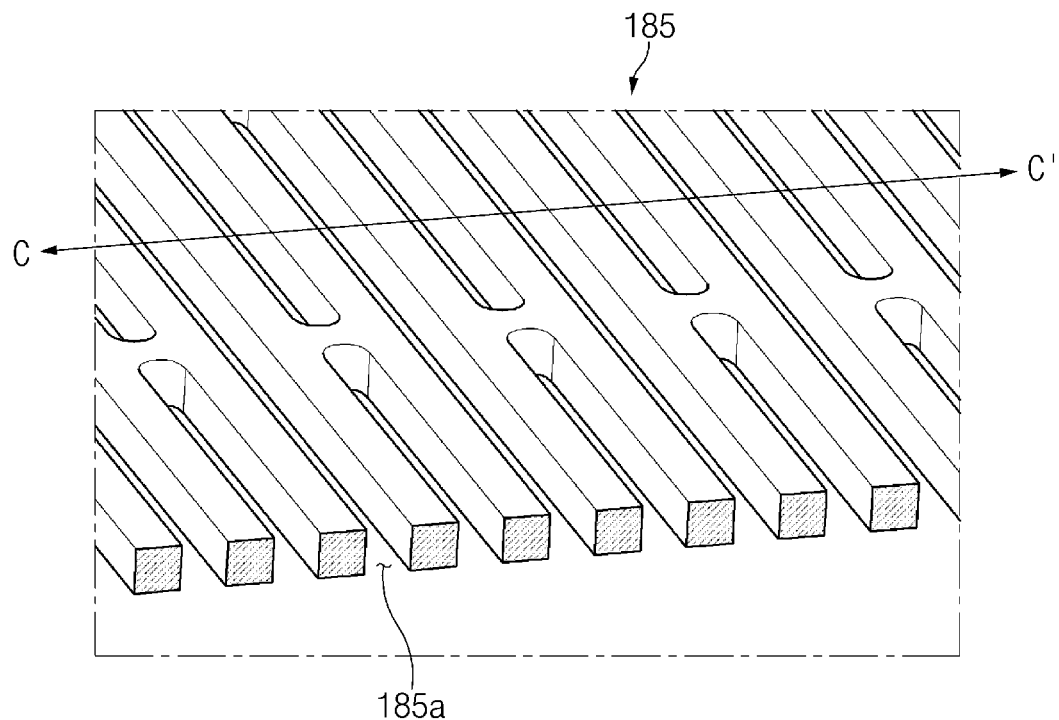
FIG. 5C is a diagram illustrating an arrangement form of a buffer layer and a metal plate according to an embodiment of the disclosure.
Figure 5C:
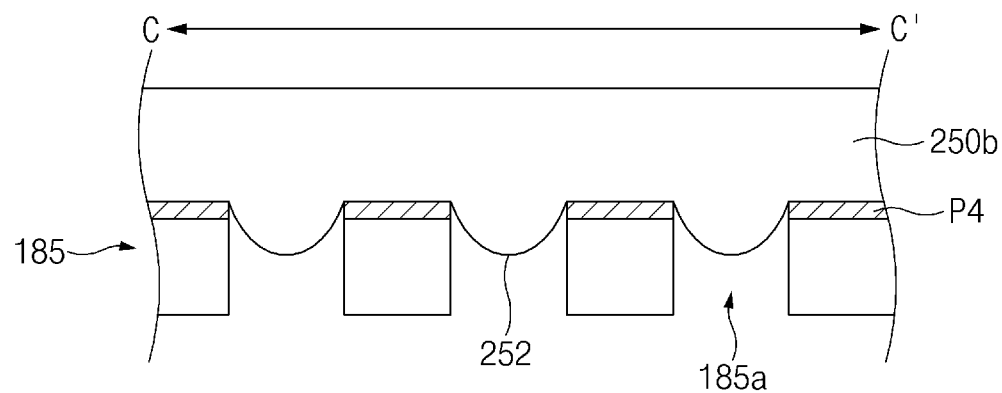

FIG. 5C is a diagram illustrating an arrangement form of a buffer layer and a metal plate according to an embodiment of the disclosure.

Referring to FIG. 5B, the cross-section of the second display assembly taken along one direction may be regarded as a cross-section taken along the line A-A' illustrated in FIG. 5A or 5B. Furthermore, the second display assembly may be similar to the display assembly (e.g., the flexible display assembly 200 of FIG. 2 or the first display assembly 200*a* of FIG. 4A) mentioned above with reference to the above-mentioned figures, or may further include other embodiments. In the following descriptions of the second display assembly, elements corresponding to the elements (or layers) of the above-mentioned display assemblies may be referred to by similar reference numerals, and overlapping descriptions may be omitted.

Referring to FIGS. 5A, 5B, and 5C, the electronic device 100*a* (FIG. 5A or 5B) according to an embodiment (e.g., the first embodiment) of the disclosure may further include a metal plate 180 (FIG. 5A or 5B) arranged and adhering on the first housing structure 111 (FIG. 5A or 5B) and the second housing structure 113 (FIG. 5A or 5B). For example, the metal plate 180 may be arranged, on the first surface 111*a* (FIG. 5A or 5B) of the first housing structure 111 and the third surface 113*a* (FIG. 5A or 5B) of the second housing structure 113. The metal plate 180 may be arranged in a form in which the metal plate 180 is folded or faces at least a part of the first surface 111*a* and the third surface 113*a*.

In an embodiment of the disclosure, the metal plate 180 may include a first plate 181 (FIG. 5A or 5B) adhering to the first surface 111*a* of the first housing structure 111 based on the specified adhesive member P5 (FIG. 5B), a second plate 183 (FIG. 5A or 5B) adhering to the third surface 113*a* of the second housing structure 113, and a flexible region 185 (FIG. 5A, 5B, or 5C) connecting the first plate 181 and the second plate 183. In relation to this configuration, a second display assembly 200*b* (FIG. 5B) may be arranged on (e.g., in the opposite direction to the first direction (direction ①) the metal plate 180 in a form in which the second display assembly 200*b* adheres to the first plate 181, the flexible region 185, and the second plate 183 via the adhesive member P4 (FIG. 5B). The flexible region 185 may be folded or unfolded together with the second display assembly 200*b*. According to this configuration, the metal plate 180 may perform a folding or unfolding motion together with the second display assembly 200*b* based on the flexible region 185. The metal plate 180 may reduce a stress acting on a longitudinal center axis region (e.g., the first region 205 of FIG. 2) of the second display assembly 200*b* during a folding or unfolding motion of the second display assembly 200*b*. The metal plate 180 may suppress a rigidity decrease of the center axis region. Alternatively, the metal plate 180 may shield surrounding noise to suppress malfunction of the display assembly 200*b*. In various embodiments of the disclosure, at least a part of the first plate 181 and the second plate 183 may include at least one fourth opening 187 and/or 189 (FIG. 5A or 5B) for supporting reduction of a weight of the electronic device 100*a*.

In an embodiment of the disclosure, the flexible region 185 of the metal plate 180 may include a plurality of fifth openings 185*a* (FIG. 5A or 5C) arranged with a separation distance therebetween. According to various embodiments of the disclosure, the plurality of fifth openings 185*a* may be formed by performing press processing or laser processing on the flexible region 185. In an embodiment of the disclosure, the plurality of fifth openings 185*a* may include an elliptical shape of a long hole, and may be regularly or irregularly formed along a longitudinal direction of the flexible region 185 and a widthwise direction perpendicular to the longitudinal direction. According to an embodiment of the disclosure, a grating structure may be formed by the plurality of fifth openings 185 in the flexible region 185. At least a part of the flexible region 185 may be flexibly folded or unfolded based on an elastic force that exhibits through the grating structure formed by the plurality of fifth openings 185*a*. In various embodiments of the disclosure, the flexible region 185 may include, aside from the plurality of fifth openings 185*a*, a plurality of lattices and a grating structure formed by the plurality of lattices. Alternatively, the flexible region 185 may include, aside from the plurality of fifth openings 185*a* or the plurality of lattices, a plurality of slits and a grating structure formed by the plurality of slits.

According to various embodiments of the disclosure, the grating structure (or the flexible region 185 of the metal plate 180) formed by the plurality of fifth openings 185*a* (or a plurality of lattices or a plurality of slits) may be formed to have an area equivalent to or greater than a space between the first surface 111*a* of the first housing structure 111 arranged under the metal plate 180 in the first direction (direction ①) and the third surface 113*a* of the second housing structure 113. In an embodiment of the disclosure, the grating structure formed by the plurality of fifth openings 185*a* (or a grating structure formed by a plurality of lattices or a grating structure formed by a plurality of slits) may form protrusions and recesses in the flexible region 185.

In an embodiment of the disclosure, the second display assembly 200*b* arranged on the metal plate 180 may include a window layer 210*b* (FIG. 5B) (e.g., a polymer layer or a UTG layer) and a buffer layer 250*b* (FIG. 5B or 5C) arranged under the window layer 210*b* in the first direction (direction ①), and a display panel layer 230*b* (FIG. 5B) and a support layer 240*b* (FIG. 5B) (e.g., a material having an elastic modulus characteristic within a range of from about 50 GPa to about $10^3$ GPa) may be further included sequentially in the first direction (direction ①) between the window layer 210*b* and the buffer layer 250*b*. In various embodiments of the disclosure, at least one polarization layer 220*b* (FIG. 5B) may be further arranged in at least a part between the window layer 210*b* and the display panel layer 230*b* and between the display panel layer 230*b* and the support layer 240*b*. According to various embodiments of the disclosure, the metal plate 180 may be a un-even structure layer arranged under the buffer layer 250*d* in the first direction (direction ①) and may be included as a portion of elements (or portion of layers) of the second display assembly 200*b*.

With regard to a laminate cross-section of the buffer layer 250*b* and the metal plate 180 taken along the line C-C' illustrated in FIG. 5C, a rear surface of the buffer layer 250*b* (e.g., one surface facing or contacting the metal plate 180) may include a plurality of projections 252 (FIG. 5C), at least a part of which is inserted into a valley (e.g., the plurality of fifth openings 185*a*, a separation distance between a plurality of lattices, or a plurality of slits) of protrusions and recesses (e.g., the grating structure formed by the plurality of fifth openings 185*a*, a grating structure formed by a plurality of lattices, or a grating structure formed by a plurality of slits) included in the flexible region 185. According to an embodiment of the disclosure, insertion of at least a part of the plurality projections 252 into the valley of the protrusions and recesses may suppress a phenomenon in which the buffer layer 250*b* is deformed and a phenomenon, caused by the deformation of the buffer layer 250*b*, in which a pattern similar to the protrusions and recesses is viewed by the user from the outside of the electronic device 100*a*. In relation to this configuration, for flexible insertion of the plurality of projections 252 into the valley, at least a part of the buffer layer 250*b* may include a material having a density of about 0.85 g/cm3 or less or about 0.7 g/cm3 or less. For example, an entire region of the buffer layer 250*b* may include a material having the above density characteristic. For another example, a region of the buffer layer 250*b*, which corresponds to the protrusions and recesses (or a grating structure or the flexible region 185) of the metal plate 180, may include a material having the above density characteristic, and another region other than the above region may include a material having another density characteristic (e.g., density of greater than about 0.85 g/cm3 or greater than about 0.7 g/cm3).

An electronic device of another aspect, to which a display assembly according to various embodiments of the disclosure may be applied, will be described with reference to FIGS. 6A and 6B.

Figure 6A:
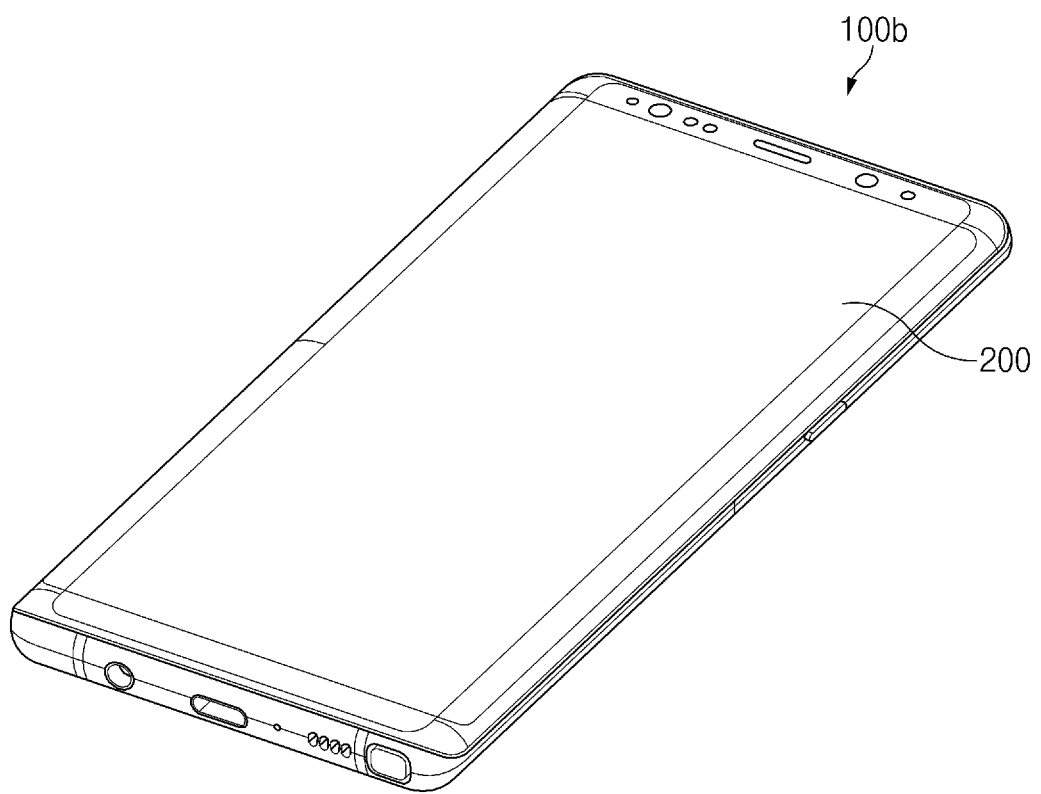
FIG. 6A is a diagram illustrating an electronic device according to an embodiment of the disclosure.

FIG. 6A is a diagram illustrating an electronic device according to an embodiment of the disclosure.

Figure 6B:
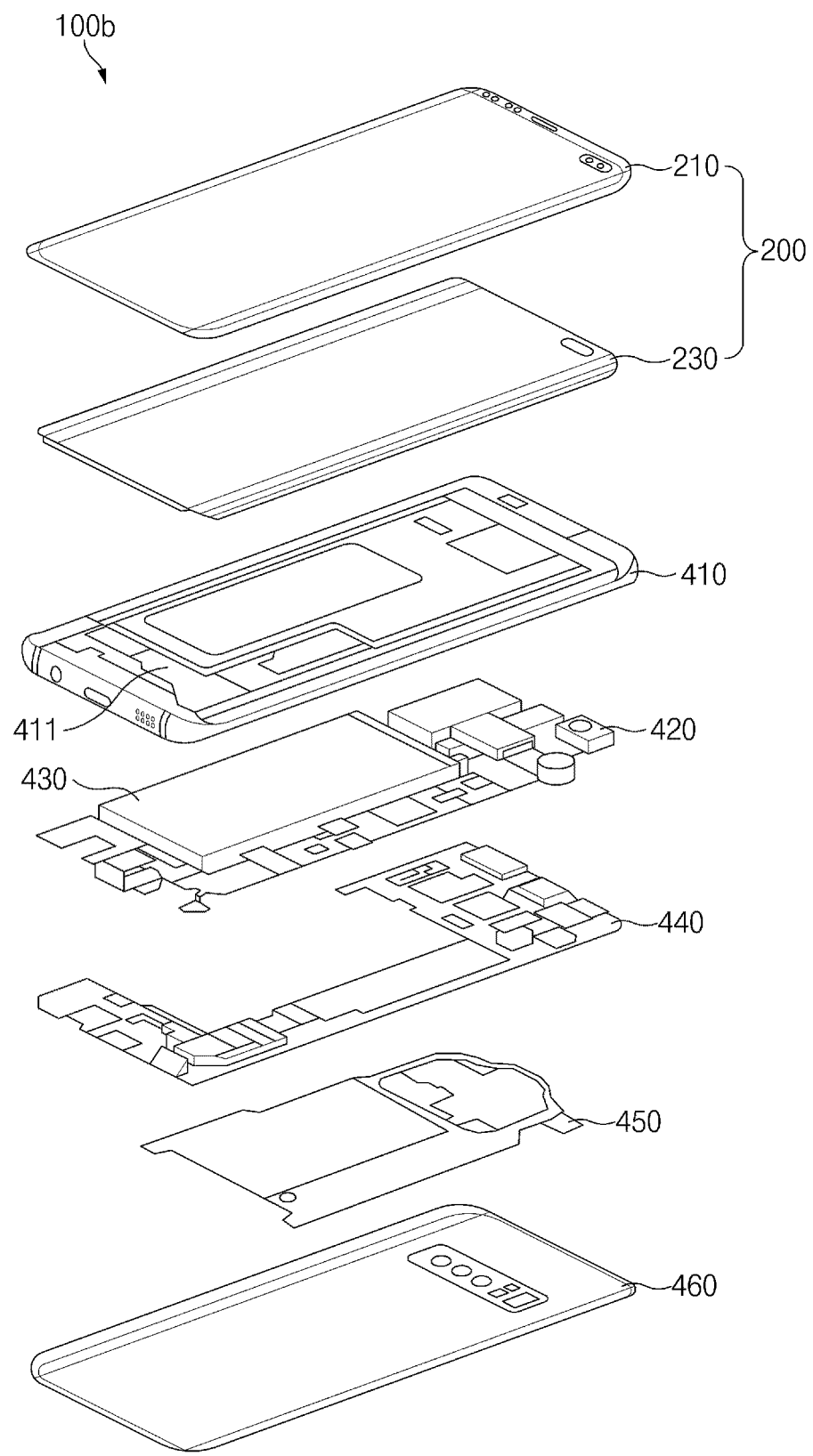
FIG. 6B is a diagram illustrating a configuration of an electronic device according to an embodiment of the disclosure.

FIG. 6B is a diagram illustrating a configuration of an electronic device according to an embodiment of the disclosure.

Referring to FIGS. 6A and 6B, an electronic device 100*b* (FIG. 6A or 6B) according to an embodiment (e.g., the second embodiment) of the disclosure may include a flexible display assembly 200 (FIG. 6A or 6B), a side surface member 410 (FIG. 6B) including a first support member 411 (FIG. 6B), a printed circuit board 420 (FIG. 6B), a battery 430 (FIG. 6B), a second support member 440 (FIG. 6B), an antenna 450 (FIG. 6B), and a cover 460 (FIG. 6B). In various embodiments of the disclosure, at least one of the foregoing elements may be omitted or another element may be added to the electronic device 100*b*.

In an embodiment of the disclosure, the first support member 411 may be connected (or coupled) to the side surface member 410 or may be integrated with the side surface member 410, and an edge region of the side surface member 410 may extend so as to form a height difference with the first support member 411. In an embodiment of the disclosure, connection (or coupling) of the first support member 411 and the side surface member 410 may form a housing of the electronic device 100*b*. Alternatively, when the cover 460 is coupled to at least one region of the side surface member 410 in a state in which the first support member 411 is connected (or coupled) to the side surface member 410, the housing of the electronic device 100*b* may be formed.

In an embodiment of the disclosure, the flexible display assembly 200 may be arranged in a first cavity (e.g., a first cavity formed by one surface of the first support member 411 and an extending edge region of the side surface member 410) formed by connecting (or coupling) the first support member 411 and the side surface member 410. The printed circuit board 420, the battery 430, the second support member 440, and the antenna 450 may be arranged in a second cavity (e.g., a second cavity formed by another surface of the first support member 411, the extending edge region of the side surface member 410, and the cover 460) formed by coupling the first support member 411, the side surface member 410, and the cover 460. The second support member 440, for example, may support or fix at least a portion of the printed circuit board 420, the battery 430, and the antenna 450.

In an embodiment of the disclosure, the flexible display assembly 200 may include a window layer 210 (FIG. 6B) and a display panel 230 (FIG. 6B), and may further include at least one layer for functional or structural improvement of the flexible display assembly 200. In an embodiment of the disclosure, the display assembly 200 may form a most part of a front surface of the electronic device 100*b*. At least a part of an edge region of the flexible display assembly 200 may be seamlessly bent towards the side surface member 410 to be formed as a curved surface having a specified curvature.

Figure 7:
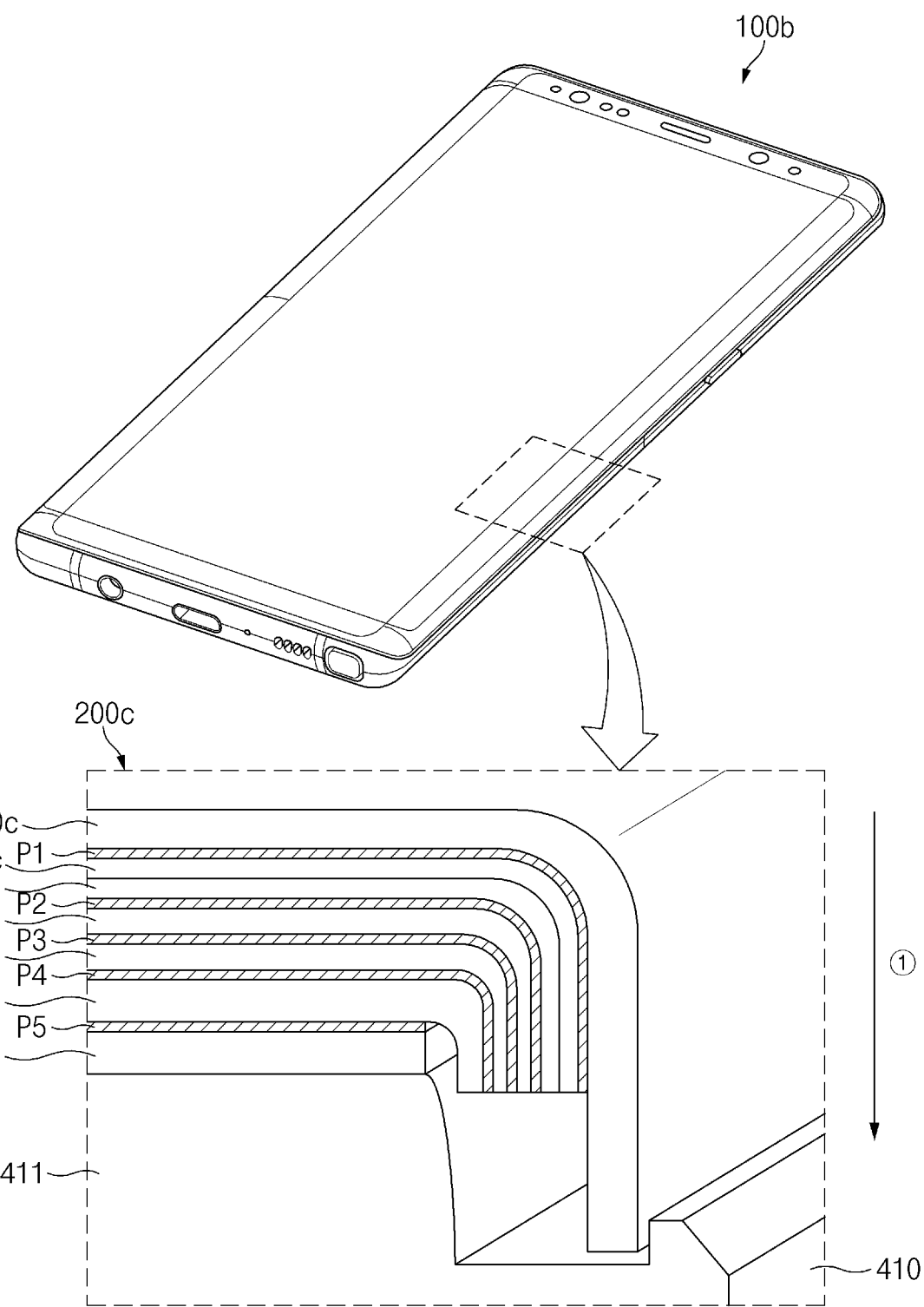
FIG. 7 is a diagram illustrating a cross-section of one region of a third display assembly according to an embodiment of the disclosure.

FIG. 7 is a diagram illustrating a cross-section of one region of a third display assembly according to an embodiment of the disclosure.

Figure 8:
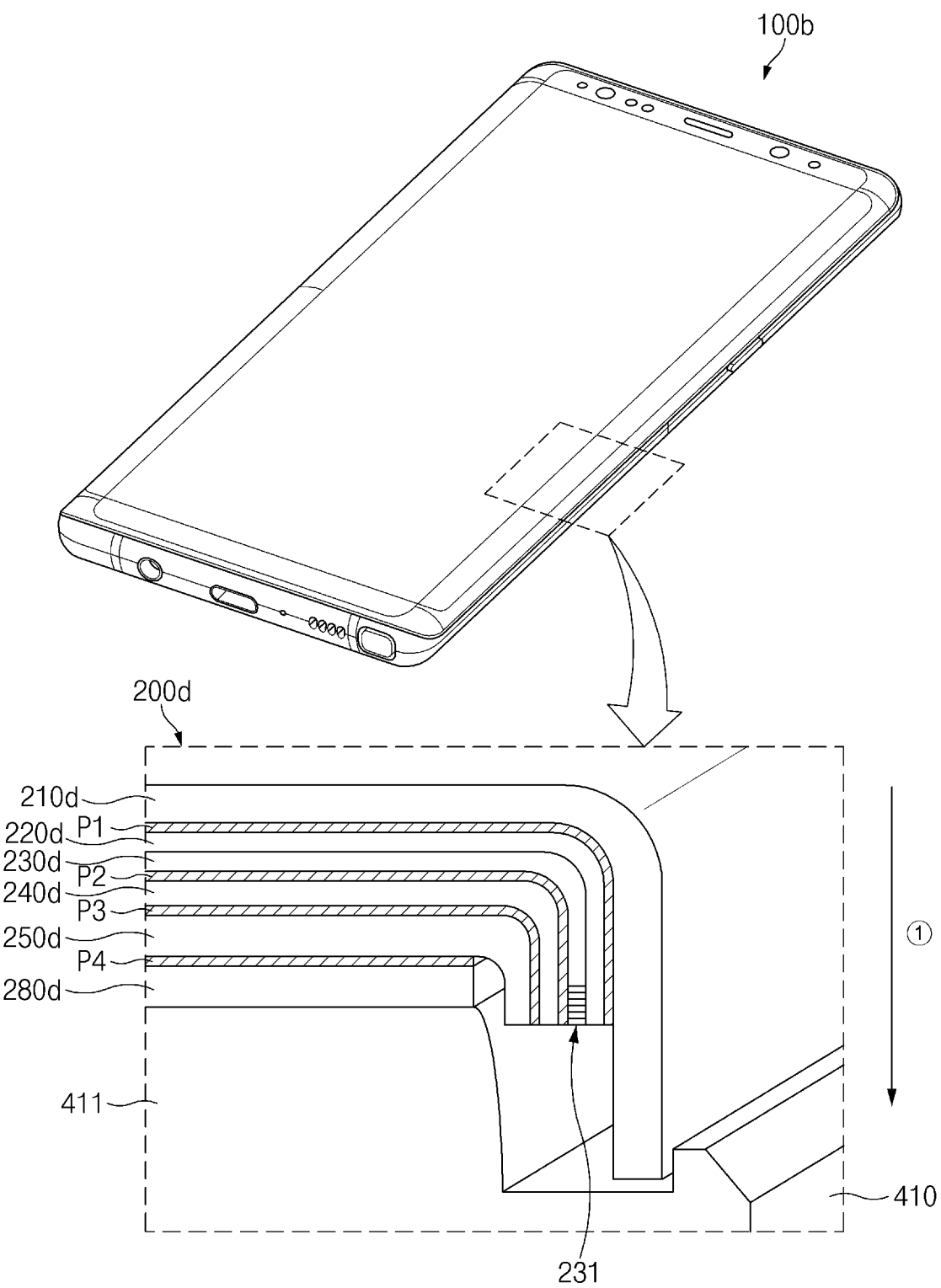
FIG. 8 is a diagram illustrating a cross-section of one region of a fourth display assembly according to an embodiment of the disclosure.

FIG. 8 is a diagram illustrating a cross-section of one region of a fourth display assembly according to an embodiment of the disclosure.

The third display assembly or the fourth display assembly may be similar to the display assemblies (e.g., the flexible display assembly 200 of FIG. 2, the first display assembly 200*a* of FIG. 4A, or the second display assembly 200*b* of FIG. 5B) mentioned above with reference to the above-mentioned figures, or may further include other embodiments. In the following descriptions of the third display assembly or the fourth display assembly, elements corresponding to the elements (or layers) of the above-mentioned display assemblies may be referred to by similar reference numerals, and overlapping descriptions may be omitted.

Referring to FIG. 7, a third display assembly 200*c* of the electronic device 100*b* according to an embodiment (e.g., the second embodiment) of the disclosure may be arranged on the housing of the electronic device 100*b*, in which the first support member 411 and the side surface member 410 are connected (or coupled or integrated). According to an embodiment of the disclosure, the third display assembly 200*c* may include a window layer 210*c* (e.g., a polymer layer or UTG layer) having a partial region that is adjacent to the side surface member 410 and is bent towards the side surface member 410 (or in the first direction (direction ①)) with a specified curvature. The third display assembly 200*c* may include a display panel layer 230*c*, a support layer 240*c* (e.g., a material having an elastic modulus characteristic within a range of from about 50 GPa to about $10^3$ GPa), a buffer layer 250*c* (e.g., a cushion layer or sponge layer), and an un-even structure layer 260*c*, which are sequentially stacked and bent with a curvature equal to or similar to the bending curvature of the window layer 201*c* under the window layer 210*c* in the first direction (direction ①).

In various embodiments of the disclosure, the third display assembly 200*c* may further include at least one polarization layer 220*c* arranged in at least a part between the window layer 210*c* and the display panel layer 230*c* and between the display panel layer 230*c* and the support layer 240*c*. In various embodiments of the disclosure, the third display assembly 200*c* may further include a heat dissipation layer 280*c* arranged between the un-even structure layer 260*c* and the first support member 411 to release heat generated in the third display assembly 200*c* to the outside or conduct the heat to another element. Although the heat dissipation layer 280*c* is illustrated as being flat without being bent, at least a part of the heat dissipation layer 280*c* may be bent with a curvature similar to the curvatures of other layers in order to increase a cross-sectional area related to improvement of efficiency of heat dissipation or heat conduction. According to various embodiments of the disclosure, the third display assembly 200*c* may further include a light shielding layer (e.g., a black layer including an embo pattern, not shown) arranged between the display panel layer 230*c* and the support part 240*c*. The light shielding layer may block light emitted from the display panel layer 230*c* or light incident from the outside of the electronic device 100*b*, and at least a part of the light shielding layer may include an opaque material (e.g., ink).

In an embodiment of the disclosure, the un-even structure layer 260*c* may include a digitizer. The digitizer may include protrusions and recesses formed by a height difference between a dielectric layer (e.g., the dielectric layer 265 of FIG. 4B) and a plurality of electrodes (e.g., the first electrode pattern 261 of FIG. 4B) spaced a specified separation distance apart. In relation to this configuration, the buffer layer 250*c* arranged on (e.g., in the opposite direction to the first direction (direction ①)) the un-even structure layer 260*c* may include at least one projection (e.g., the at least one projection 251 of FIG. 4B), at least a part of which is inserted into a valley (e.g., the valley 267 of FIG. 4B or the separation distance between a plurality of electrodes) included in the un-even structure layer 260*c*. The buffer layer 250*c*, for example, may suppress, based on the at least one projection, deformation of the buffer layer 250*c* due to the protrusions and recesses. The buffer layer 250*c* may suppress a phenomenon in which a pattern similar to the protrusions and recesses is viewed from the outside of the electronic device 100*b*.

Referring to FIG. 8, a fourth display assembly 200*d* of the electronic device 100*b* according to an embodiment (e.g., the second embodiment) of the disclosure may be arranged on the housing of the electronic device 100*b*, in which the first support member 411 and the side surface member 410 are connected (or coupled or integrated). According to an embodiment of the disclosure, the fourth display assembly 200*d* may include a window layer 210*d* (e.g., a polymer layer or UTG layer) having a partial region that is adjacent to the side surface member 410 and is bent towards the side surface member 410 (or in the first direction (direction ①)) with a specified curvature. The fourth display assembly 200*d* may include a display panel layer 230*d*, a support layer 240*d*

(e.g., a material having an elastic modulus characteristic within a range of from about 50 GPa to about $10^3$ GPa), and a buffer layer 250d (e.g., a cushion layer or sponge layer), which are sequentially stacked and bent with a curvature equal to or similar to the bending curvature of the window layer 201d under the window layer 210d in the first direction (direction ①). In various embodiments of the disclosure, at least one polarization layer 220d may be further arranged in at least a part between the window layer 210d and the display panel layer 230d and between the display panel layer 230d and the support layer 240d. A flat or bent heat dissipation layer 280d may be further arranged between the buffer layer 250d and the first support member 411. Alternatively, a light shielding layer (e.g., a black layer including an embo pattern, not shown) for blocking light emitted from the display panel layer 230d or light incident from the outside of the electronic device 100b may be further arranged between the display panel layer 230d and the support layer 240d.

In an embodiment of the disclosure, a wiring layer 231 may be arranged in a region adjacent to a terminal end of the bent display panel 230d between the at least one polarization layer 220d and the support layer 240d. The wiring layer 231, for example, may include at least one signal line formed on a printed circuit board in relation to operation of the printed circuit board and the fourth display assembly 200d. In an embodiment of the disclosure, the at least one signal line may form a height difference with the printed circuit board, and may form protrusions and recesses due to the height difference on the printed circuit board. In relation to this configuration, when an external impact is applied to a rear surface (e.g., the cover 460 of FIG. 6B) of the electronic device 100b, the at least one signal line may be damaged (e.g., cracked and/or disconnected) in the wiring layer 231 due to a contact between a ridge (e.g., at least one signal line) of the protrusions and recesses and an adjacent layer, thus causing malfunction of the fourth display assembly 200d. In an embodiment of the disclosure, the buffer layer 250d arranged adjacent to the wiring layer 231 may absorb or reduce the external impact applied to the electronic device 100b to thereby suppress a transfer of impact to the wiring layer 231.

An electronic device of another aspect, to which a display assembly according to various embodiments of the disclosure may be applied, will be described with reference to FIGS. 9A, 9B, 9C, and 9D.

Figure 9A:
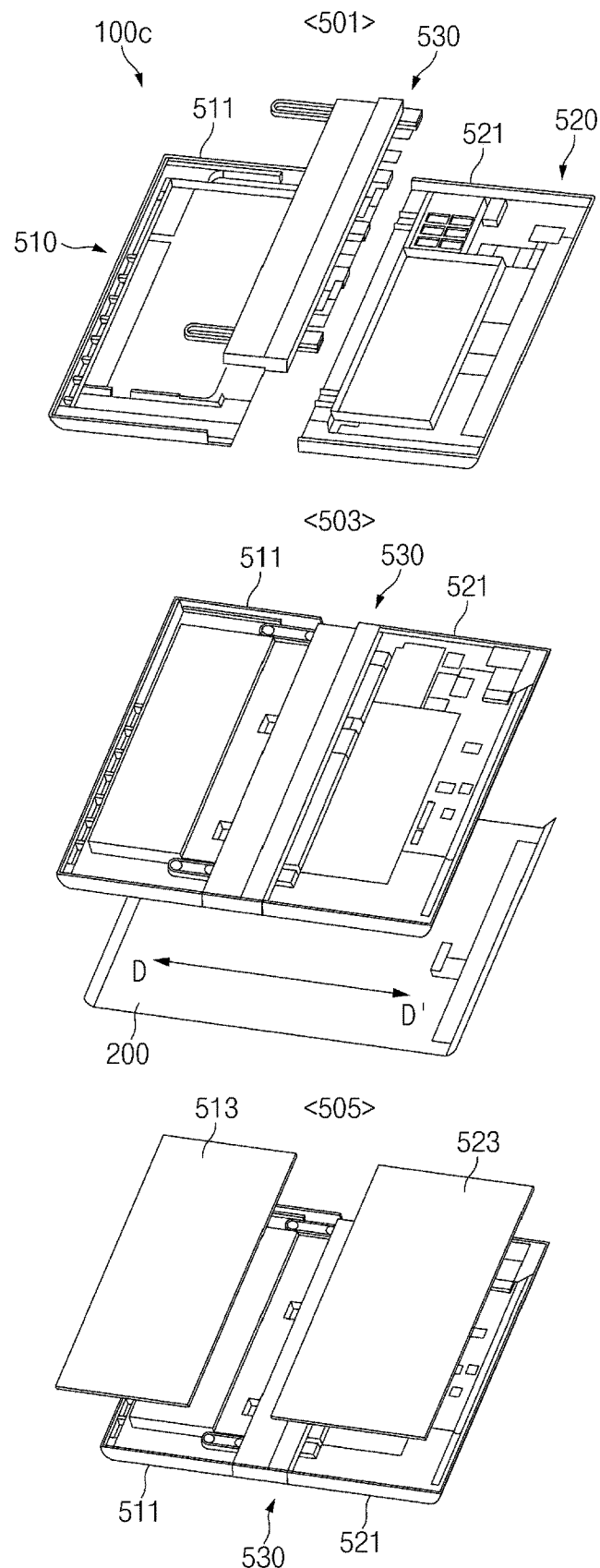
FIG. 9A is a diagram illustrating a configuration of an electronic device according to an embodiment of the disclosure.

FIG. 9A is a diagram illustrating a configuration of an electronic device according to an embodiment of the disclosure.

Figure 9B:
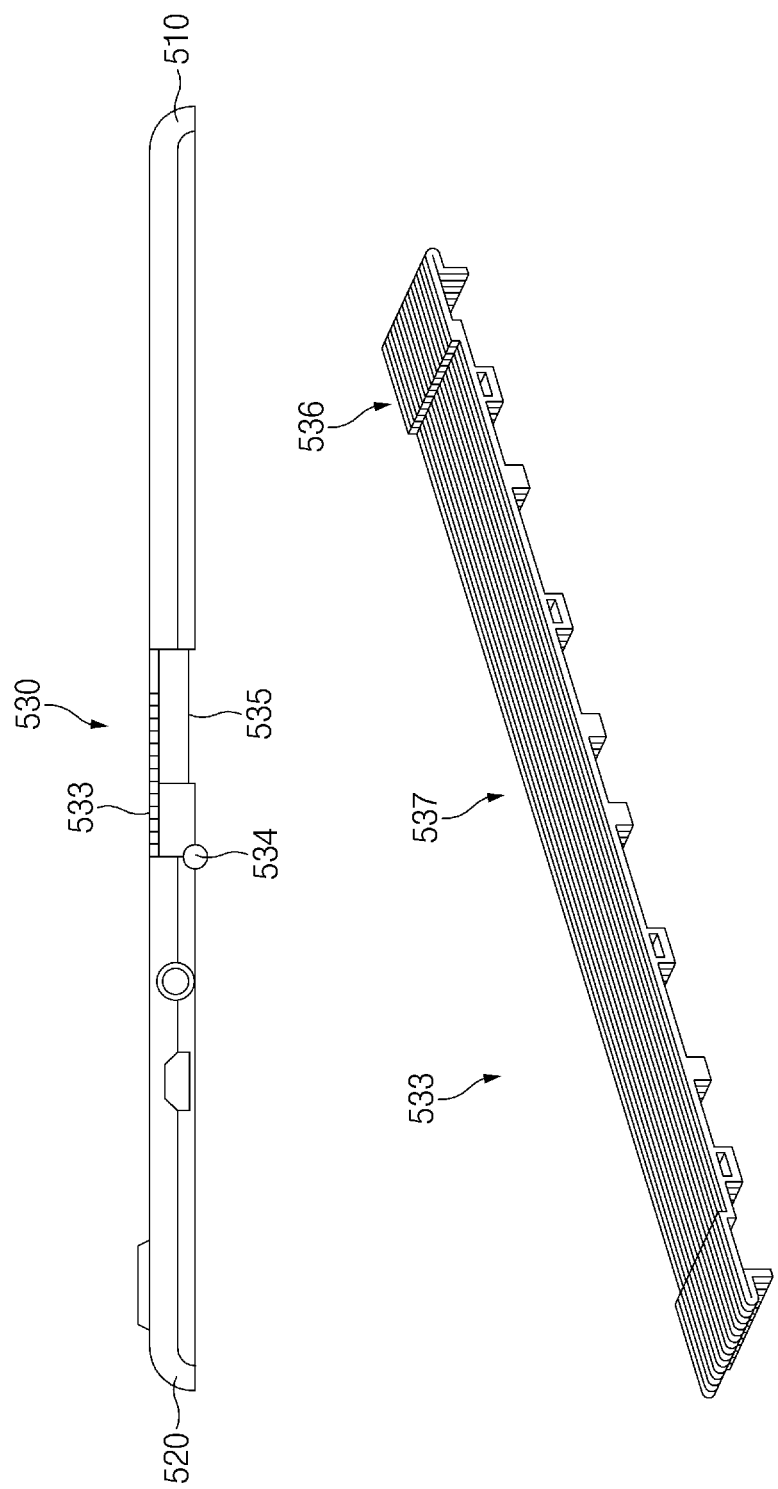
FIG. 9B is a diagram illustrating a multi-bar of a hinge structure according to an embodiment of the disclosure.

FIG. 9B is a diagram illustrating a multi-bar of a hinge structure according to an embodiment of the disclosure.

Figure 9C:
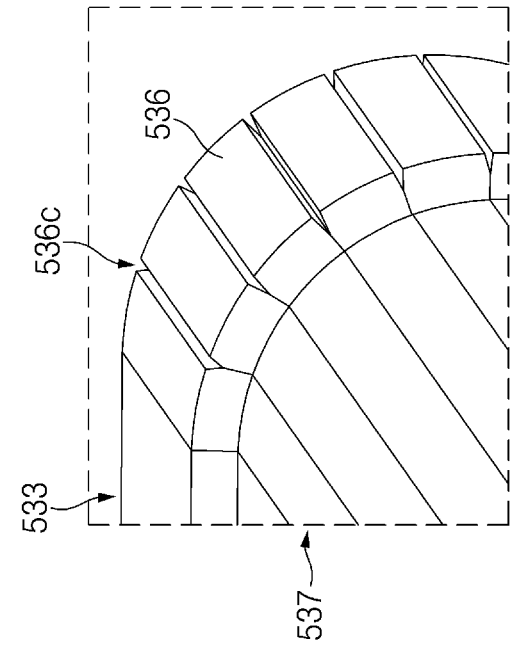
FIG. 9C is a diagram illustrating a form of a multi-bar when an electronic device according to an embodiment of the disclosure.
Figure 9C:
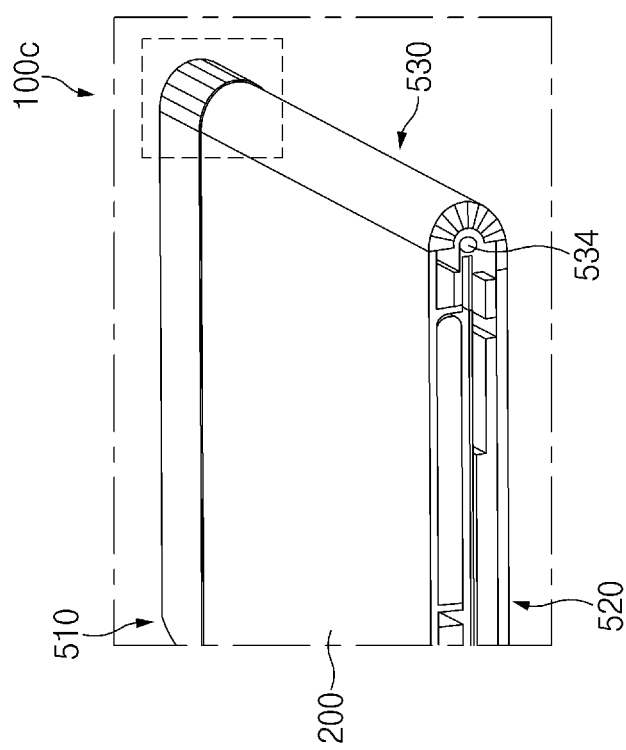

FIG. 9C is a diagram illustrating a form of a multi-bar when an electronic device according to an embodiment of the disclosure.

Figure 9D:
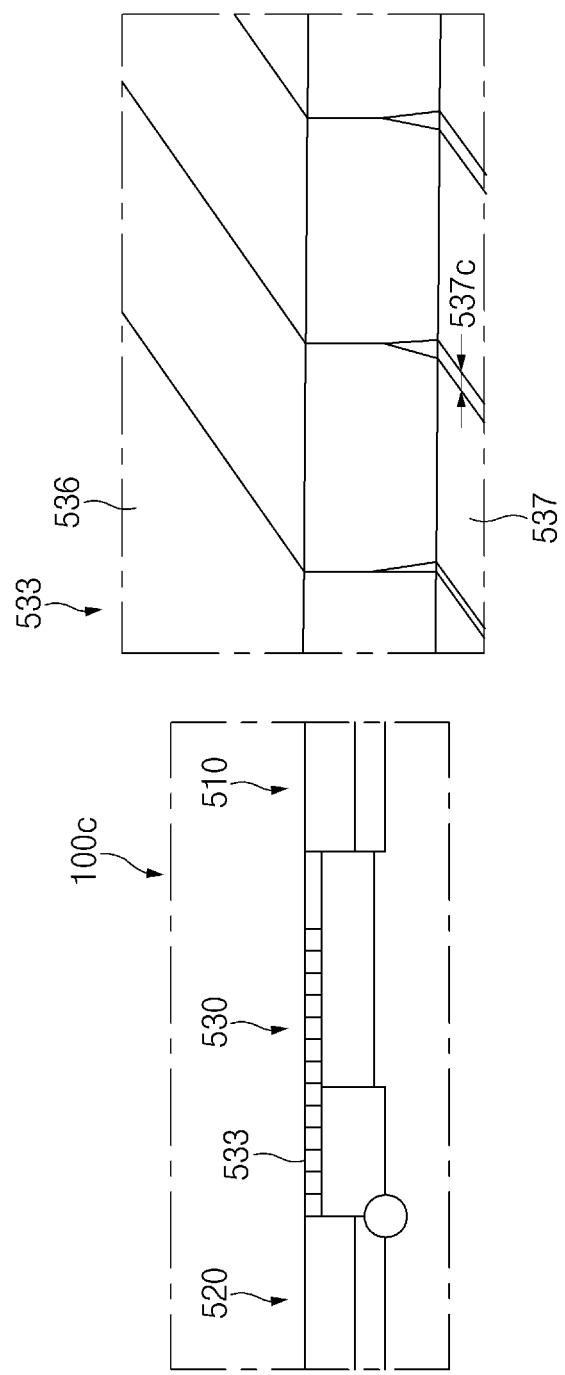
FIG. 9D is a diagram illustrating a form of a multi-bar when an electronic device according to an embodiment of the disclosure.

FIG. 9D is a diagram illustrating a form of a multi-bar when an electronic device according to an embodiment of the disclosure.

Referring to FIGS. 9A, 9B, 9C, and 9D, an electronic device 100c (FIG. 9A, 9C, or 9D) according to an embodiment (e.g., the third embodiment) of the disclosure may include a first housing structure 520 (FIG. 9A, 9B, 9C, or 9D), a second housing structure 510 (FIG. 9A, 9B, 9C, or 9D), a hinge module 530 (FIG. 9A, 9B, 9C, or 9D), and a flexible display assembly 200 (FIG. 9A or 9C).

Referring to state 501 of FIG. 9A, the first housing structure 520 and the second housing structure 510 may be connected via the hinge module 530. For example, the hinge module 530 may be arranged between the first housing structure 520 and the second housing structure 510. One region of the hinge module 530 may be coupled to an edge of one side of the first housing structure 520 and another region of the hinge module 530 may be coupled to an edge of one side of the second housing structure 510. In this case, a first upper cover 521 (FIG. 9A) included in the first housing structure 520 and a second upper cover 511 (FIG. 9A) included in the second housing structure 510 may be aligned side by side.

Referring to state 503 of FIG. 9A, the first upper cover 521 of the first housing structure 520 and the second upper cover 511 of the second housing structure 510 are connected via the hinge module 530. The flexible display assembly 200 may be arranged on a front surface of the first upper cover 521, a front surface of the hinge module 530, and a front surface of the second upper cover 511 in a form in which the flexible display assembly 200 faces or contacts the front surface of the first upper cover 521, the front surface of the hinge module 530, and the front surface of the second upper cover 511. In an embodiment of the disclosure, the flexible display assembly 200 may form a most part of a front surface of the electronic device 100c when the electronic device 100c is in an unfolded state.

In an embodiment of the disclosure, the flexible display assembly 200 may include a first display region arranged on the first upper cover 521, a second display region arranged on the second upper cover 511, and a third display region arranged on the hinge module 530. The first display region, the second display region, and the third display region may be a single display region without a physical partition. In an embodiment of the disclosure, in the flexible display assembly 200, the first display region may be a front screen of the electronic device 100c or the second display region may be the front screen of the electronic device 100c according to a form in which the electronic device 100c is gripped or mounted.

In an embodiment of the disclosure, when the electronic device 100c is in the third state (e.g., a folded state or bent state), the first display region and the second display region may face each other. The third display region may be arranged between the first display region and the second display region so as to be observed from a side of the electronic device 100c. Alternatively, when the electronic device 100c is in the fourth state (e.g., an unfolded state or spread state), the first display region, the second display region, and the third display region may be arranged so as to be oriented in the same direction or similar directions.

Referring to state 505 of FIG. 9A, a first lower cover 523 included in the first housing structure 520 may be coupled to a rear surface of the first upper cover 521 and a part of the hinge module 130. A second lower cover 513 included in the second housing structure 510 may be coupled to a rear surface of the second upper cover 511 and another part of the hinge module 130. The first lower cover 523 and the second lower cover 513 may form a greater part of the rear surface of the electronic device 100c when the electronic device 100c is in an unfolded state.

In an embodiment of the disclosure, the hinge module 530 may include a hinge shaft 534 (FIG. 9B or 9C), a sliding part 535 (FIG. 9B), and a multi-bar 533 (FIG. 9B, 9C, or 9D). The hinge shaft 534 may hinge-fix the first housing structure 520 and the sliding part 535. The hinge shaft 534 may support a hinge motion of the first housing structure 520 and the sliding part 535 so that the sliding part 535 may pivot with respect to the first housing structure 520. One region of the sliding part 535 may be retracted into the second housing structure 510. When the electronic device 100c performs a folding motion, the one region of the sliding part 535 may be maintained in a state in which the one region of the sliding part 535 is retracted into the second housing structure 510. When the electronic device 100c performs an unfolding motion, the one region of the sliding part 535 may be withdrawn by a predetermined distance from the second housing structure 510 so that the one region of the sliding part 535 retracted into the second housing structure 510 may be minimized. The multi-bar 533 may be arranged to correspond to a rear surface of the flexible display assembly 200. For example, the multi-bar 533 may be arranged under the third display region of the flexible display assembly 200 arranged on the hinge module 530. In an embodiment of the disclosure, the multi-bar 533 may be continuously arranged in a flat form by an external force or may be curved at an angle within a specified range.

In an embodiment of the disclosure, the multi-bar 533 may include a placement part 537 (FIG. 9B, 9C, or 9D), and a step part 536 (FIG. 9A, 9B, or 9C). On the placement part 537 the third display region of the flexible display assembly 200 is arranged. The placement part 537 may have a form of a plurality of continuously connected joints. The step part 536 protects a side surface of the flexible display assembly 200 arranged on the placement part 537. The step part 536 guides the side surface of the flexible display assembly 200 when a state of the electronic device 100c is changed.

In an embodiment of the disclosure, when the electronic device 100c is in the third state (e.g., a folded state or bent state), the plurality of joints included in the multi-bar 533 may be curved to form a semicircular shape (see FIG. 9C). Here, the placement part 537 of each of the plurality of joints may be close to and substantially contact the placement part 537 of an adjacent joint. The step part 536 of each of the plurality of joints may be spaced apart from the step part 536 of an adjacent joint to form a first slit 536c (FIG. 9C) having a predetermined width.

In an embodiment of the disclosure, when the electronic device 100c is in the fourth state (e.g., an unfolded state or spread state), the plurality of joints included in the multi-bar 533 may form a plat shape (see FIG. 9D). Here, the placement part 537 of each of the plurality of joints may be spaced apart from the placement part 537 of an adjacent joint to form a second slit 537c (FIG. 9D) having a predetermined width. The step part 536 of each of the plurality of joints may be close to and substantially contact the step part 536 of an adjacent joint. According to this configuration, in the fourth state in which the electronic device 100c is unfolded or spread, protrusions and recesses may be formed by a plurality of second slits 537c on the placement part 537 of the multi-bar 533 on which the flexible display assembly 200 is arranged.

Figure 10:
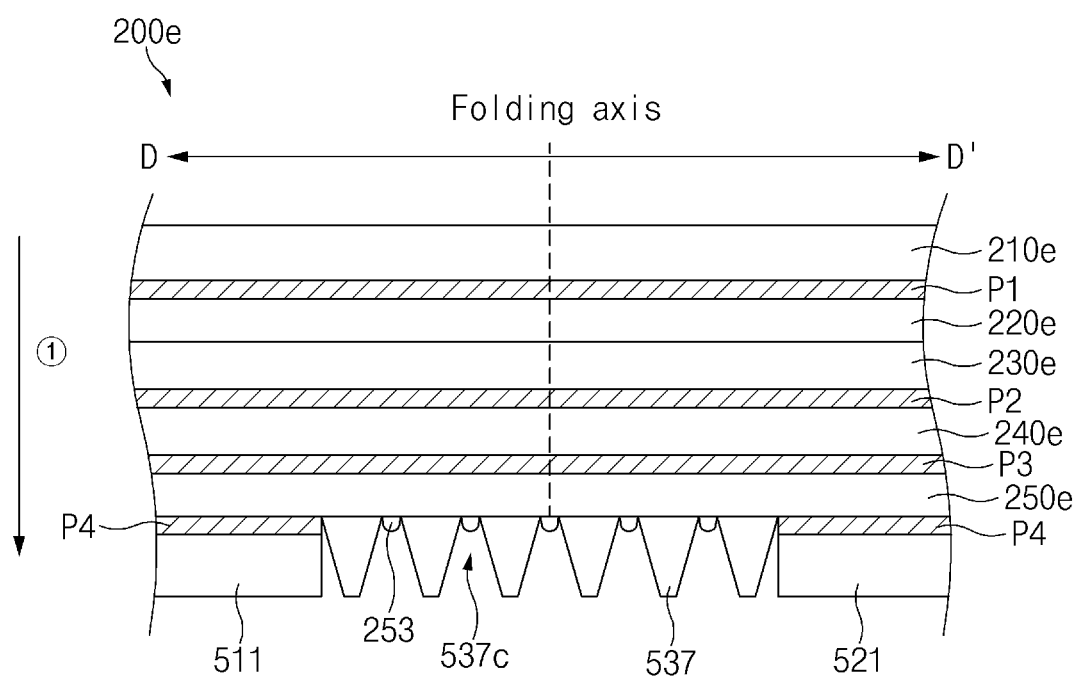
FIG. 10 is a diagram illustrating a cross-section of a fifth display assembly taken along one direction according to an embodiment of the disclosure.

FIG. 10 is a diagram illustrating a cross-section of a fifth display assembly taken along one direction according to an embodiment of the disclosure.

Referring to FIG. 10, the cross-section of the fifth display assembly taken along one direction may be regarded as a cross-section taken along the line D-D' illustrated in FIG. 9A. Furthermore, the fifth display assembly may be similar to the display assemblies (e.g., the flexible display assembly 200 of FIG. 2, the first display assembly 200a of FIG. 4A, the second display assembly 200b of FIG. 5B, the display assembly 200c of FIG. 7, or the fourth display assembly 200d of FIG. 8) mentioned above with reference to the above-mentioned figures, or may further include other embodiments. In the following descriptions of the fifth display assembly, elements corresponding to the elements (or layers) of the above-mentioned display assemblies may be referred to by similar reference numerals, and overlapping descriptions may be omitted.

Referring to FIG. 10, a fifth display assembly 200e of an electronic device (e.g., the display device 100c of FIG. 9A) according to an embodiment (e.g., the third embodiment) of the disclosure may be arranged on a front surface of a first upper cover (e.g., the first upper cover 521 of FIG. 9A) of a first housing structure (e.g., the first housing structure 520 of FIG. 9A), a front surface of a hinge module (e.g., the hinge module 530 of FIG. 9A), and a front surface of a second upper cover (e.g., the second upper cover 511 of FIG. 9A) of a second housing structure (e.g., the second housing structure 510 of FIG. 9A). For example, the fifth display assembly 200e may be arranged in a form in which the fifth display assembly 200e faces or contacts the front surface of the first upper cover 521, the front surface of the hinge module 530, and the front surface of the second upper cover 511. At least a part of the fifth display assembly 200e may be arranged on the placement part 537 of a multi-bar (e.g., the multi-bar 533 of FIG. 9B) included in the hinge module 530.

In an embodiment of the disclosure, the fifth display assembly 200e may include a window layer 210e (e.g., a polymer layer or UTG layer). The fifth display assembly 200e may include a display panel layer 230e, a support layer 240e (e.g., a material having an elastic modulus characteristic within a range of from about 50 GPa to about $10^3$ GPa), and a buffer layer 250e (e.g., a cushion layer or sponge layer), which are sequentially stacked under the window layer 210e in the first direction (direction ①). In various embodiments of the disclosure, at least one polarization layer 220e may be further arranged in at least a part between the window layer 210e and the display panel layer 230e and between the display panel layer 230e and the support layer 240e.

According to an embodiment of the disclosure, the buffer layer 250e may include at least one projection 253 for absorbing or relieving protrusions and recesses (e.g., the protrusions and recesses formed by the plurality of second slits 537c) of the placement part 537 arranged under the buffer layer 250e in the first direction (direction ①). In an embodiment of the disclosure, in the fourth state (e.g., an unfolded state or spread state) of the electronic device 100c, at least a part of the at least one projection 253 may be inserted into a valley (e.g., the plurality of second slits 537c). In an embodiment of the disclosure, when the electronic device 100c performs a motion to enter the third state (e.g., a folded state or bent state), at least a part of the at least one projection 253 inserted into the valley of the protrusions and recesses may be deformed. For example, at least a part of the at least one projection 253 inserted into the valley of the protrusions and recesses may be stretched due to a folding motion of the fifth display assembly 200e. Due to the stretching, a shape of the at least one projection 253 protruding from a surface of the buffer layer 250e may be more smoothly deformed compared to the case in which the fifth display assembly 200e is in an unfolded state. Accordingly, when the fifth display assembly 200e is in a folded state (or the electronic device 100c is in the third state), the at least one projection 253 of the buffer layer 250e may be removed from the valley of the protrusions and recesses due to the deformation of the shape. Or, the at least one projection 253 of the buffer layer 250e may be inserted into the valley of the protrusions and recesses with a smaller volume compared to the case in which the fifth display assembly 200e is in an unfolded state (or the electronic device 100c is in the fourth state).

A flexible display assembly according to the above various embodiments of the disclosure may include a display panel layer, a un-even structure layer, at least a part of which includes protrusions and recesses, a buffer layer arranged between the display panel layer and the un-even structure layer and including at least one projection, at least a part of which is inserted into a valley of the protrusions and recesses, and a support layer arranged on one surface of the buffer layer and formed to support at least a part of the buffer layer.

According to various embodiments of the disclosure, the un-even structure layer may include a digitizer for detecting an input by a digital pen.

According to various embodiments of the disclosure, the digitizer may include a dielectric layer and a plurality of electrodes, which are arranged with a specified separation distance therebetween on the dielectric layer to form a height difference with the dielectric layer.

According to various embodiments of the disclosure, the protrusions and recesses may include a plurality of electrode patterns based on the height difference between the plurality of electrodes and the dielectric layer.

According to various embodiments of the disclosure, the valley of the protrusions and recesses may include the separation distance between the plurality of electrodes.

According to various embodiments of the disclosure, the un-even structure layer may include a metal plate for reinforcing rigidity of the flexible display assembly.

According to various embodiments of the disclosure, the metal plate may include, in one region thereof, a plurality of openings arranged with a separation distance therebetween.

According to various embodiments of the disclosure, the protrusions and recesses may include a grating structure of the metal plate based on the plurality of openings.

According to various embodiments of the disclosure, the valley of the protrusions and recesses may include the plurality of openings.

According to various embodiments of the disclosure, at least a part of the buffer layer may include a characteristic of density having a specified value or less.

According to various embodiments of the disclosure, the buffer layer may be formed to have a first strength, and the support layer may be formed to have a second strength higher than the first strength.

According to various embodiments of the disclosure, the buffer layer may include, in at least a part thereof, an ultra-thin glass (UTG).

According to various embodiments of the disclosure, at least a part of the support layer may include a characteristic of elastic modulus within a range of from about 50 GPa to about $10^3$ GPa.

According to various embodiments of the disclosure, the flexible display assembly may further include a metal layer arranged under the un-even structure layer.

According to various embodiments of the disclosure, at least a part of the metal layer may include magnetic metal powder (MMP).

According to various embodiments of the disclosure, the flexible display assembly may further include at least one polarization layer arranged at least partially on the display panel layer and between the display panel layer and the support layer.

An electronic device according to the above various embodiments of the disclosure may include at least one hinge structure, a first housing structure arranged on one side of the at least one hinge structure and connected to one region of the at least one hinge structure, a second housing structure arranged on another side of the at least one hinge structure, connected to another region of the at least one hinge structure, and performing folding and unfolding motions with respect to the first housing structure based on a hinge motion of the at least one hinge structure, and a flexible display assembly arranged so as to be supported by at least a part of the first housing structure and at least a part of the second housing structure.

According to various embodiments of the disclosure, the flexible display assembly may include a display panel layer, a un-even structure layer, at least a part of which includes protrusions and recesses, a buffer layer arranged between the display panel layer and the un-even structure layer and including at least one projection, at least a part of which is inserted into a valley of the protrusions and recesses, and a support layer arranged on one surface of the buffer layer and formed to support at least a part of the buffer layer.

According to various embodiments of the disclosure, the un-even structure layer may include a digitizer for detecting an input by a digital pen.

According to various embodiments of the disclosure, the digitizer may include a dielectric layer and a plurality of electrodes, which are arranged with a specified separation distance therebetween on the dielectric layer to form a height difference with the dielectric layer.

According to various embodiments of the disclosure, the protrusions and recesses may include a plurality of electrode patterns based on the height difference between the plurality of electrodes and the dielectric layer.

According to various embodiments of the disclosure, the valley of the protrusions and recesses may include the separation distance between the plurality of electrodes.

According to various embodiments of the disclosure, the electronic device may further include a metal plate arranged between the flexible display assembly and the first housing structure and second housing structure.

According to various embodiments of the disclosure, the metal plate may include, in one region thereof corresponding to the at least one hinge structure, a plurality of openings arranged with a separation distance therebetween.

According to various embodiments of the disclosure, the un-even structure layer may include the metal plate.

According to various embodiments of the disclosure, the protrusions and recesses may include a grating structure of the metal plate based on the plurality of openings.

According to various embodiments of the disclosure, the valley of the protrusions and recesses may include the plurality of openings.

According to various embodiments of the disclosure, the buffer layer may be formed to have a first strength, and the support layer may be formed to have a second strength higher than the first strength.

According to various embodiments of the disclosure, the flexible display assembly may further include at least one polarization layer arranged at least partially on the display panel layer and between the display panel layer and the support layer.

An electronic device according to the above various embodiments of the disclosure may include a support member, a side surface member connected to at least a part of an edge of the support member, and a display assembly arranged in a space formed by connecting the support member and the side surface member.

According to various embodiments of the disclosure, the display assembly may include a window layer having a partial region that is adjacent to the side surface member and is bent in a first manner towards the side surface member with a specified curvature, a display panel layer arranged on one surface of the window layer and bent in a second manner with a curvature corresponding to the specified curvature, a wiring layer formed in a terminal end of a region, which is bent in the second manner, of the display panel layer and including at least one protrusion and recess, and a buffer layer arranged on one surface of the display panel layer so that at least a part of the buffer layer is adjacent to the wiring layer, wherein the at least a part adjacent to the wiring layer is inserted into the valley of the at least one protrusion and recess.

According to various embodiments of the disclosure, the flexible display assembly may further include a support layer arranged on one surface of the buffer layer and formed to support at least a part of the buffer layer.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A flexible display assembly comprising:
   a display panel layer;
   an un-even structure layer, at least a part of which comprises protrusions and recesses;
   a buffer layer arranged between the display panel layer and the un-even structure layer and comprising at least one projection, at least a part of which is inserted into a valley of the protrusions and recesses; and
   a support layer arranged on one surface of the buffer layer and formed to support at least a part of the buffer layer,
   wherein the un-even structure layer comprises a digitizer for detecting an input by a digital pen, and
   wherein the digitizer comprises a dielectric layer and a plurality of electrodes, which are arranged with a specified separation distance therebetween on the dielectric layer to form a height difference with the dielectric layer.

2. The flexible display assembly of claim 1,
   wherein the protrusions and recesses comprise a plurality of electrode patterns based on the height difference between the plurality of electrodes and the dielectric layer, and
   wherein the valley of the protrusions and recesses comprises the separation distance between the plurality of electrodes.

3. The flexible display assembly of claim 1,
   wherein the un-even structure layer further comprises a metal plate for reinforcing rigidity of the flexible display assembly, and
   wherein the metal plate comprises, in one region thereof, a plurality of openings arranged with a separation distance therebetween.

4. The flexible display assembly of claim 3,
   wherein the protrusions and recesses comprise a grating structure of the metal plate based on the plurality of openings, and
   wherein the valley of the protrusions and recesses comprises the plurality of openings.

5. The flexible display assembly of claim 1, wherein at least a part of the buffer layer comprises a characteristic of density having a specified value or less.

6. The flexible display assembly of claim 1,
   wherein the buffer layer is formed to have a first strength, and
   wherein the support layer is formed to have a second strength higher than the first strength.

7. The flexible display assembly of claim 1, wherein the buffer layer comprises, in at least a part thereof, an ultra-thin glass (UTG).

8. The flexible display assembly of claim 1, wherein at least a part of the support layer comprises a characteristic of elastic modulus within a range of from about 50 GPa to about $10^3$ GPa.

9. The flexible display assembly of claim 1, further comprising a metal layer arranged under the un-even structure layer, wherein at least a part of the metal layer comprises magnetic metal powder (MMP).

10. The flexible display assembly of claim 1, further comprising at least one polarization layer arranged at least partially on the display panel layer and between the display panel layer and the support layer.

11. An electronic device comprising:
    at least one hinge structure;
    a first housing structure arranged on one side of the at least one hinge structure and connected to one region of the at least one hinge structure;
    a second housing structure arranged on another side of the at least one hinge structure, connected to another region of the at least one hinge structure, and performing folding and unfolding motions with respect to the first housing structure based on a hinge motion of the at least one hinge structure; and
    a flexible display assembly arranged so as to be supported by at least a part of the first housing structure and at least a part of the second housing structure,
    wherein the flexible display assembly comprises:
      a display panel layer;
      an un-even structure layer, at least a part of which includes protrusions and recesses;
      a buffer layer arranged between the display panel layer and the un-even structure layer and comprising at least one projection, at least a part of which is inserted into a valley of the protrusions and recesses; and
      a support layer arranged on one surface of the buffer layer and formed to support at least a part of the buffer layer.

12. The electronic device of claim 11,
    wherein the un-even structure layer comprises a digitizer for detecting an input by a digital pen, and
    wherein the digitizer comprises a dielectric layer and a plurality of electrodes, which are arranged with a specified separation distance therebetween on the dielectric layer to form a height difference with the dielectric layer.

13. The electronic device of claim 12,
    wherein the protrusions and recesses comprise a plurality of electrode patterns based on the height difference between the plurality of electrodes and the dielectric layer, and
    wherein the valley of the protrusions and recesses comprises the separation distance between the plurality of electrodes.

14. The electronic device of claim 11, further comprising:
    a metal plate arranged between the flexible display assembly and the first housing structure and second housing structure, wherein the metal plate comprises, in one region thereof corresponding to the at least one hinge structure, a plurality of openings arranged with a separation distance therebetween.

15. The electronic device of claim 14,
wherein the un-even structure layer comprises the metal plate,
wherein the protrusions and recesses comprise a grating structure of the metal plate based on the plurality of openings, and
wherein the valley of the protrusions and recesses comprises the plurality of openings.

16. The electronic device of claim 11,
wherein the buffer layer is formed to have a first strength, and
wherein the support layer is formed to have a second strength higher than the first strength.

17. The electronic device of claim 11, wherein the flexible display assembly further comprises at least one polarization layer arranged at least partially on the display panel layer and between the display panel layer and the support layer.

18. An electronic device comprising:
a support member;
a side surface member connected to at least a part of an edge of the support member; and
a display assembly arranged in a space formed by connecting the support member and the side surface member, wherein the display assembly comprises:
a window layer having a partial region that is adjacent to the side surface member and is bent in a first manner towards the side surface member with a specified curvature;
a display panel layer arranged on one surface of the window layer and bent in a second manner with a curvature corresponding to the specified curvature;
a wiring layer formed in a terminal end of a region, which is bent in the second manner, of the display panel layer and comprising at least one protrusion and recess; and
a buffer layer arranged on one surface of the display panel layer so that at least a part of the buffer layer is adjacent to the wiring layer, wherein the at least a part adjacent to the wiring layer is inserted into a valley of the at least one protrusion and recess.

19. The electronic device of claim 18, wherein the flexible display assembly further comprises a support layer arranged on one surface of the buffer layer and formed to support at least a part of the buffer layer.

20. The electronic device of claim 18, wherein at least a part of the buffer layer comprises a characteristic of density having a specified value or less.

21. The electronic device of claim 18, wherein the buffer layer comprises, in at least a part thereof, an ultra-thin glass (UTG).

* * * * *